US012654788B2

(12) United States Patent
Sauvageau et al.

(10) Patent No.: US 12,654,788 B2
(45) Date of Patent: Jun. 16, 2026

(54) TRACK SYSTEM

(71) Applicant: SOUCY INTERNATIONAL INC.,
Drummondville (CA)

(72) Inventors: Yves Sauvageau, Drummondville (CA);
Pierre-Yves Pepin, Drummondville
(CA); Marc Nadeau, Drummondville
(CA); Branislav Nanac,
Drummondville (CA); **Genevieve
Therrien, Drummondville (CA); Andre
Todd, Mont St-Hilaire (CA); Cedric
Alliguie**, Saint-Hyacinthe (CA);
Jonathan Lapalme, Drummondville
(CA); Nicolas Dubuc, Mercier (CA);
Philippe Jaillet-Gosselin,
Drummondville (CA)

(73) Assignee: SOUCY INTERNATIONAL INC.,
Drummondville (CA)

( * ) Notice: Subject to any disclaimer, the term of this
patent is extended or adjusted under 35
U.S.C. 154(b) by 208 days.

(21) Appl. No.: 18/679,698

(22) Filed: May 31, 2024

(65) Prior Publication Data

US 2024/0317333 A1 Sep. 26, 2024

Related U.S. Application Data

(62) Division of application No. 17/272,795, filed as
application No. PCT/IB2019/057550 on Sep. 6, 2019,
now Pat. No. 12,030,565.
(Continued)

(51) Int. Cl.
*B62D 55/084* (2006.01)
*B62D 55/065* (2006.01)
(Continued)

(52) U.S. Cl.
CPC ......... *B62D 55/084* (2013.01); *B62D 55/065*
(2013.01); *B62D 55/14* (2013.01); *B62D 55/24*
(2013.01)

(58) Field of Classification Search
CPC .................................................... B62D 55/116
See application file for complete search history.

(56) References Cited

U.S. PATENT DOCUMENTS

| 3,340,790 A | 9/1967 | Simjian |
| 3,430,790 A | 3/1969 | Beltrami |
| (Continued) | | |

FOREIGN PATENT DOCUMENTS

| CA | 1289854 C | 10/1991 |
| DE | 19620759 A1 | 12/1996 |
| (Continued) | | |

OTHER PUBLICATIONS

English translation of abstract for DE19620759 retrieved from
Espacenet on Nov. 29, 2023.
(Continued)

*Primary Examiner* — Kevin Hurley
(74) *Attorney, Agent, or Firm* — BCF LLP

(57) ABSTRACT

A track system for use with a vehicle includes an attachment
assembly connectable to the chassis of the vehicle having a
multi-pivot assembly having a first pivot extending longi-
tudinally and defining a roll pivot axis, and a second pivot
extending laterally and defining a pitch pivot axis. A frame
assembly is disposed laterally outwardly from the attach-
ment assembly and connected thereto. The frame assembly
includes at least one wheel-bearing frame member. The track
system further includes at least one actuator connected
between the attachment assembly and the frame assembly
for pivoting the frame assembly about the roll pivot axis, a
leading idler wheel assembly, a trailing idler wheel assem-
(Continued)

bly, at least one support wheel assembly, and an endless track.

19 Claims, 22 Drawing Sheets

Related U.S. Application Data

(60) Provisional application No. 62/728,161, filed on Sep. 7, 2018, provisional application No. 62/728,669, filed on Sep. 7, 2018, provisional application No. 62/728,662, filed on Sep. 7, 2018, provisional application No. 62/728,690, filed on Sep. 7, 2018, provisional application No. 62/728,697, filed on Sep. 7, 2018, provisional application No. 62/728,673, filed on Sep. 7, 2018.

(51) Int. Cl.
  B62D 55/14 (2006.01)
  B62D 55/24 (2006.01)

(56) References Cited

U.S. PATENT DOCUMENTS

| | | | | |
|---|---|---|---|---|
| 3,447,620 | A | * | 6/1969 | Schooover .......... B62D 55/116 305/20 |
| 6,158,539 | A | | 12/2000 | Isley |
| 6,315,374 | B1 | | 11/2001 | Johansson |
| 6,564,889 | B1 | | 5/2003 | Yamazaki et al. |
| 6,712,549 | B2 | | 3/2004 | Roth |
| 6,962,222 | B2 | | 11/2005 | Kirihata |
| 7,017,688 | B2 | | 3/2006 | Bowers et al. |
| 7,690,738 | B2 | * | 4/2010 | Wilt .................... B62D 55/305 305/144 |
| 8,540,040 | B2 | | 9/2013 | Simula et al. |
| 8,640,797 | B2 | | 2/2014 | Allaire |
| 8,985,250 | B1 | | 3/2015 | Lussier et al. |
| 9,096,264 | B2 | | 8/2015 | Connors et al. |
| 9,169,623 | B2 | | 10/2015 | Rebinsky |
| 9,359,021 | B2 | | 6/2016 | Janzen et al. |
| 9,415,818 | B1 | | 8/2016 | Tiede et al. |
| 9,682,736 | B1 | * | 6/2017 | Prickel ................... B62D 55/04 |
| 9,688,322 | B1 | * | 6/2017 | Prickel ................. B62D 55/084 |
| 9,855,843 | B2 | | 1/2018 | Vik et al. |
| 9,989,976 | B2 | | 6/2018 | Garvin et al. |
| 11,008,055 | B2 | * | 5/2021 | Dybro ................. B62D 55/116 |
| 2013/0154345 | A1 | | 6/2013 | Schulz |
| 2016/0068205 | A1 | | 3/2016 | Hellholm et al. |
| 2016/0159414 | A1 | | 6/2016 | Hansen |
| 2017/0098987 | A1 | | 4/2017 | Gieras |
| 2017/0261450 | A1 | | 9/2017 | Baarman et al. |
| 2018/0190045 | A1 | | 7/2018 | Richard et al. |
| 2019/0023333 | A1 | * | 1/2019 | Prickel .............. B62D 55/0655 |
| 2019/0233033 | A1 | | 8/2019 | Harnetiaux |

FOREIGN PATENT DOCUMENTS

| | | | | |
|---|---|---|---|---|
| DE | 102012109085 | A1 | 3/2014 | |
| DE | 102016008968 | A1 | 1/2018 | |
| EP | 2150458 | B1 | 3/2012 | |
| EP | 2727803 | A2 | 5/2014 | |
| EP | 3449716 | A1 | 10/2020 | |
| GB | 2449513 | A * | 11/2008 | .......... B62D 55/305 |
| JP | 2000135993 | A | 5/2000 | |
| JP | 4680355 | B2 | 5/2011 | |
| KR | 20190032889 | A * | 3/2019 | .......... B62D 55/116 |
| WO | 2014121999 | A1 | 8/2014 | |
| WO | 2017049393 | A1 | 3/2017 | |
| WO | 2019046929 | A1 | 3/2019 | |
| WO | 2020049530 | A2 | 3/2020 | |
| WO | 2020049533 | A2 | 3/2020 | |

OTHER PUBLICATIONS

English translation of abstract for JP2000135993 retrieved from Espacenet on Nov. 29, 2023.

English translation of abstract for JP4680355 retrieved from Espacenet on Nov. 29, 2023.

English translation of abstract for EP3449716 retrieved from Espacenet on Nov. 29, 2023.

English translation of abstract for DE102012109085 retrieved from Espacenet on Nov. 29, 2023.

English translation of abstract for DE102016008968 retrieved from Espacenet on Nov. 29, 2023.

Supplementary European Search Report for EP 19853721 issued on Jul. 30, 2022; Szaip, Andras.

International Search Report from PCT/IB2019/057553 dated Apr. 29, 2020, Lee Young.

International Search Report from PCT/IB2019/057545 dated Apr. 28, 2020, Lee Young.

International Search Report from PCT/IB2019/057552 dated Apr. 28, 2020, Lee Young.

International Search Report from PCT/IB2019/057550 dated Apr. 28, 2020, Lee Young.

Supplementary European Search Report for EP 19857372.7 issued on Aug. 29, 2022; Szaip, Andras.

Supplementary European Search Report for EP 19858344.5 issued on Aug. 29, 2022; Szaip, Andras.

* cited by examiner

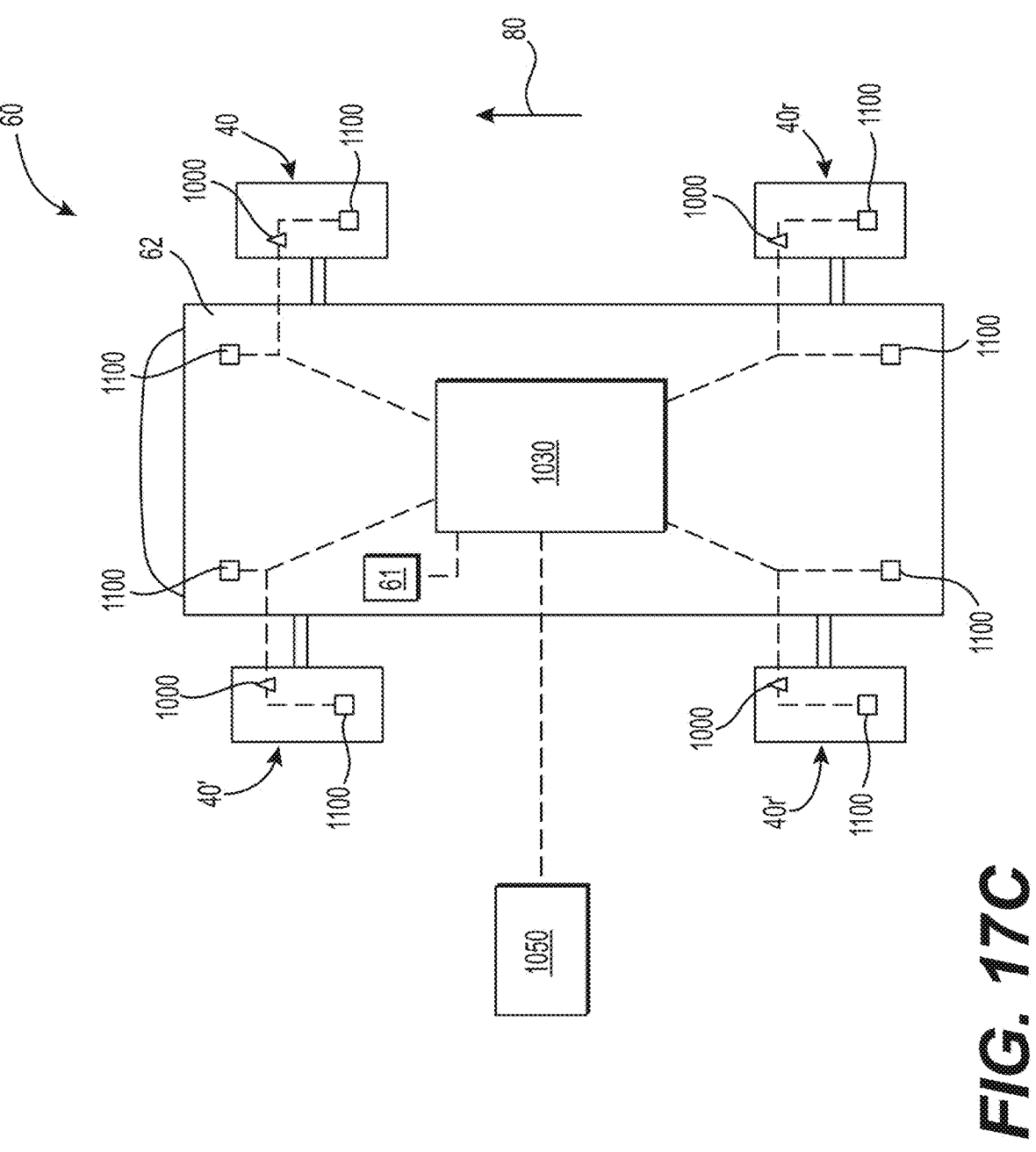
_FIG. 17C_

1

TRACK SYSTEM

CROSS-REFERENCE TO RELATED APPLICATIONS

The present application is a divisional patent application from Ser. No. 17/272,795 which is a National Stage Entry of PCT/IB2019/057550 filed on Sep. 6, 2019 which claims priority to U.S. Provisional Patent Application Ser. No. 62/728,161, filed Sep. 7, 2018, entitled "Track System", U.S. Provisional Patent Application Ser. No. 62/728,662, filed Sep. 7, 2018, entitled "Track System", U.S. Provisional Patent Application Ser. No. 62/728,669, filed Sep. 7, 2018, entitled "Track System", U.S. Provisional Patent Application Ser. No. 62/728,673, filed Sep. 7, 2018, entitled "Track System", U.S. Provisional Patent Application Ser. No. 62/728,690, filed Sep. 7, 2018, entitled "Vehicle", and U.S. Provisional Patent Application Ser. No. 62/728,697, filed Sep. 7, 2018, entitled "Track System". Each one of these patent applications is incorporated by reference herein in its entirety.

TECHNICAL FIELD

The present technology relates to track systems for vehicles.

BACKGROUND

Certain vehicles, such as, for example, agricultural vehicles (e.g., harvesters, combines, tractors, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kind of ground surfaces and, as these vehicles are generally heavy, the tires may compact the ground surface in an undesirable way due to the weight of the vehicle. As an example, when the vehicle is an agricultural vehicle, the tires may compact the soil in such a way as to undesirably inhibit the growth of crops.

In order to reduce the aforementioned drawbacks, to increase traction and to distribute the weight of the vehicle over a larger area on the ground surface, track systems were developed to replace at least some of the wheels and tires on the vehicles. For example, under certain conditions, track systems enable agricultural vehicles to be used in wet field conditions as opposed to its wheeled counterpart.

The use of track systems in place of wheels and tires, however, does present some inconveniences. One of the drawbacks of conventional track systems is that, under certain conditions, the endless track can be in contact with the ground while having an uneven load distribution across the ground contacting segment of the endless track, i.e. the portion of the endless track contacting the ground. As such, since the load is not evenly distributed across the ground contacting segment, areas of the ground contacting segment create high and low pressure spots on the ground surface. The high pressure spots cause undesirable soil compaction at different depth levels. In addition, the uneven distribution of the load along the ground contacting segment can lead to premature wear of some components of the track system. One factor that leads to the uneven distribution of the load across the ground contacting segment of an endless track under certain conditions is that the structural components of the track system do not always allow the endless track to conform to the ground surface like a tire filled with gas (air or nitrogen) does.

As such, there remains that there is a need for continued improvement in the design and configuration of track systems so that soil compaction issues and wear of some components of the track system be further reduced.

SUMMARY

It is therefore an object of the present technology to ameliorate the situation with respect to at least one of the inconveniences present in the prior art.

It is also an object of the present invention to provide an improved track system at least in some instances as compared with some of the prior art.

According to an aspect of the present technology, there is provided a track system for use with a vehicle having a chassis. The track system has an attachment assembly connectable to the chassis of the vehicle. The attachment assembly includes a multi-pivot assembly having a first pivot extending longitudinally and defining a roll pivot axis, and a second pivot extending laterally outwardly and defining a pitch pivot axis. The track system further has a frame assembly disposed laterally outwardly from the attachment assembly and connected to the attachment assembly. The frame assembly includes at least one wheel-bearing frame member. The frame assembly includes structural components of the track system capable of supporting a material portion of the weight of the vehicle.

The track system further has an actuator for pivoting the frame assembly about the roll pivot axis. The term "actuator" is used to encompass any mechanical device, such as hydraulic, electric, pneumatic powered devices, that can provide motion. In addition, the actuator is understood to be controlled using either one of a particular program running on a computer, an automated sequence of actions, and/or a manual override.

The track system further has a leading idler wheel assembly at least indirectly connected to the at least one wheel-bearing frame member, a trailing idler wheel assembly at least indirectly connected to the at least one wheel-bearing frame member, and at least one support wheel assembly at least indirectly connected to the at least one wheel-bearing frame member. In the context of the present technology, the qualification of a wheel assembly as "at least indirectly connected" includes a wheel assembly that is directly connected to the at least one wheel-bearing frame member as well as a wheel assembly that is connected to the wheel-bearing frame member through an intermediate structure or structures, be they intermediate frame members or otherwise.

The track system also has an endless track that extends around the leading idler wheel assembly, the trailing idler wheel assembly, and the at least one support wheel assembly.

The track system of the present technology is directed towards reducing soil compaction issues under certain conditions. For example, improvements in reducing soil compaction issues might be perceived when the track system pivots about the roll pivot axis as it travels over a ground surface that is sensitive to soil compaction, such as an agricultural field. When the frame assembly pivots about the roll pivot axis, the leading idler wheel assembly, the trailing idler wheel assembly, and the at least one support wheel assembly also pivot and can better conform to the profile of the ground surface such that the load applied by the wheel assemblies is more evenly distributed across the segment of the endless track engaging the ground on soil which is sensitive to compaction. The actuator controls the pivot motion of the frame assembly relative to the attachment assembly and enables the selection of the camber angle of the track system relative to the chassis of the vehicle.

In some embodiments of the track system of the present technology, the multi-pivot assembly further includes a third pivot extending generally vertically and defining a yaw pivot axis, the frame assembly being pivotable about the yaw pivot axis. The frame assembly and the wheel assemblies are thus pivotable about the yaw pivot axis relative to the attachment assembly, which enables the selection of the toe-in/toe-out angle of the track system via an actuator. The selection of the toe-in/toe-out angle of the track system may further assist is distributing more evenly the load applied by the wheel assemblies to the endless track across the segment of the endless track engaging the ground on soil which is sensitive to compaction issues, and preserve the integrity of the soil. The selection of the toe-in/toe-out angle can also assist, under some circumstances, in reducing wear of the endless track and/or other components of the track system.

In some embodiments of the track system of the present technology, the actuator is operable for pivoting the frame assembly about the roll and yaw pivot axes. In some embodiments, the actuator is a first actuator, and the track system further comprises a second actuator for pivoting the frame assembly about the yaw pivot axis. In such embodiments, the second actuator is dedicated to pivot the frame assembly about the yaw pivot axis. Operation of the second actuator enables the selection of the toe-in/toe-out angle of the track system, and in embodiments where the track system is operatively connected to a steerable component of the chassis, operation of the second actuator in conjunction with the steering system of the vehicle can further enhance steering response and facilitate turning manoeuvres.

In some embodiments of the track system of the present technology, the first actuator dynamically adjusts the pivotal positioning of the frame assembly relative to the chassis of the vehicle about the roll and yaw pivot axes. In some other embodiments of the track system of the present technology, the first and second actuators dynamically adjust the pivotal positioning of the frame assembly relative to the chassis of the vehicle about the roll and yaw pivot axes respectively. In such embodiments, the selection of the camber angle and the toe-in/toe-out angle is dynamic, i.e. the selection is reactive to a variety of input controls and/or conditions to which the track system is subjected. Thus, selection of the camber angle and the toe-in/toe-out angle can change over time depending on the conditions of operation of the track system, input from the operator and/or conditions of the ground surface on which the track system travels.

In some embodiments of the track system of the present technology, the track system further includes a tensioner operatively connected between the frame assembly and the leading idler wheel assembly. In such embodiments, the tension in the endless track can be selected depending on the operation and/or position of the actuator and/or the conditions of the ground surface on which the track system travels.

In some embodiments of the track system of the present technology, the track system further includes a leading idler actuator for adjusting the pivotal positioning of the leading idler wheel assembly relative to the frame assembly including raising the leading idler wheel assembly to reduce an amount of endless track in flat ground contact and lowering the leading idler wheel assembly to increase the amount of endless track in flat ground contact. In such embodiments, raising the leading idler wheel assembly may, under some conditions, facilitate steering of the track system, increase the approach angle of the track system when encountering an obstacle and reduce the tendency of the idler wheel assembly to pitch negatively in the ground. Lowering the leading idler wheel assembly may, under some conditions, assist in distributing the load born by the track system over a greater area and thus reduce soil compaction issues on soil which is sensitive to compaction.

In some embodiments of the track system of the present technology, the leading idler actuator assembly is connected between the frame assembly and the leading idler wheel assembly. This feature may assist in allowing embodiments of track systems of the present technology to be efficiently mechanically packaged, in embodiments where such is judged to be important.

In some embodiments of the track system of the present technology, the track system further includes a trailing idler actuator for adjusting the pivotal positioning of the trailing idler wheel assembly relative to the frame assembly including raising the trailing idler wheel assembly to reduce an amount of endless track in flat ground contact and lowering the trailing idler wheel assembly to increase the amount of endless track in flat ground contact. In such embodiments, raising the trailing idler wheel assembly may, under some conditions, facilitate steering of the track system, increase the departure angle of the track system and reduce the tendency of the track system to pitch negatively in the ground. Lowering the trailing idler wheel assembly may, under some conditions, assist in distributing the load born by the track system over a greater area and thus reduce soil compaction issues on soil which is sensitive to soil compaction.

In some embodiments of the track system of the present technology, the trailing idler actuator assembly connected between the frame assembly and the trailing idler wheel assembly. This feature may assist in allowing embodiments of track systems of the present technology to be efficiently mechanically packaged, in embodiments where such is judged to be important.

In some embodiments of the track system of the present technology, the track system further includes a track system controller operatively connected to at least one of the actuators described above and the tensioner. The track system controller operates at least one of the actuators and the tensioner in response to signals received or processed by the track system controller. The track system controller can thus control motion of the components of the track system relative to one another depending on signals, whether received from a manual override by an operator of the vehicle equipped with the track system or obtained from processed signals provided by other sources. In some embodiments, the track system controller operates the actuators and the tensioner in a collaborative, synergistic fashion so as to prevent premature wear of components of the track system and/or in order to better distribute the load born by the track system across the segment of the endless track engaging the ground. This feature may thus assist in further reducing soil compaction issues caused by the track system on soil which is sensitive to soil compaction and may reduce wear of the endless track and/or other components of the track system in some circumstances.

In some embodiments of the track system of the present technology, the track system further includes monitoring sensors operatively connected to the track system controller. The monitoring sensors send signals to the track system controller, and the track system controller operates at least one of the actuators and the tensioner in response to the signals received from the monitoring sensors. The track system controller can thus control movement of the components of the track system relative to one another depending on signals received from the monitoring sensors. This feature may further assist in preventing premature wear of components of the track system and/or in order to better distribute the load born by the track system across the segment of the endless track engaging the ground on soil which is sensitive to soil compaction.

In some embodiments of the track system of the present technology, the monitoring sensors include at least one of load sensors, temperature sensors, accelerometers, strain gauges, fluid property sensors, inclinometers, actuator assembly position sensors, geographical location sensors, hygrometers, penetrometers, sonar devices, ultrasonic devices, microwave-based devices, radar devices and lidar devices. This feature enables the track system controller to control movement of the components of the track system relative to one another based on data collected by the monitoring sensors and related to a state of the track system and/or a ground surface condition which include, for example, and not limited to, the load supported by certain components of the track system, temperature of certain components of the track system, vibrations undergone by certain components of the track system, the geographical location of the track system, and certain properties of the ground on which the track system travels. This feature may further assist in preventing premature wear of components of the track system and/or in order to better distribute the load born by the track system across the segment of the endless track engaging the ground on soil which is sensitive to soil compaction.

In some embodiments, the track system controller operates at least one of the actuators and the tensioner in response to signals received from a manual override by an operator of the vehicle equipped with the track system, a master control unit, a remote processing unit, and/or a remote master control unit.

According to another aspect of the present technology, there is also provided a vehicle having first and second track systems in accordance with embodiments of the present technology, in which the track system controller of the first track system is operatively connected to the track system controller of the second track system. This feature enables the first and second track systems to control motion of their respective components relative to one another based on signals received from one another in a collaborative, synergistic fashion, which may in turn assist in preventing premature wear of components of the track system, for instance.

In some embodiments of the vehicle of the present technology, at least some of the monitoring sensors are mounted to the chassis of the vehicle. This feature enables the track system controller to control movement of the components of the track system relative to one another based on data collected by the monitoring sensors and related to, for example and not limited to, the load supported by the vehicle and/or operating conditions of the vehicle.

In some embodiments of the track system of the present technology, the actuator is a first actuator, and the track system further comprises a second actuator for pivoting the frame assembly about the yaw pivot axis. In some embodiments, the second actuator includes a leading tracking actuator located forward of the second pivot, and/or a trailing tracking actuator located rearward of the second pivot. This feature may assist in allowing embodiments of track systems of the present technology to select and maintain the toe-in/toe-out angle of the track system while being efficiently mechanically packaged, in embodiments where such is judged to be important.

In some embodiments of the track system of the present technology, the multi-pivot assembly includes a yoke, a pivot arm pivotally connected to the yoke by the first pivot and pivoting about the roll pivot axis, and a plate connected to the pivot arm by the third pivot and pivoting about the yaw pivot axis. The second pivot projects from the plate, and the plate is pivotable about the roll and yaw pivot axes relative to the yoke. In such embodiments, the plate supports the second pivot which bears a portion of the weight of the vehicle. This feature may assist in allowing embodiments of track systems of the present technology to be efficiently mechanically packaged, in embodiments where such is judged to be important.

In some embodiments of the track system of the present technology, at least one of the first and second actuator includes an actuator operatively connected between the plate and the yoke. In such embodiments, the plate provides attachment points for the first and second actuator while supporting the second pivot which bears a portion of the weight of the vehicle. This feature may assist in allowing embodiments of track systems of the present technology to be efficiently mechanically packaged, in embodiments where such is judged to be important.

In some embodiments of the track system of the present technology, the plate has an aperture defined therein, and a stop projects from the frame assembly and extends within the aperture. The stop is structured and dimensioned to limit pivotal motion of the frame assembly relative to the plate. This feature may also assist in allowing embodiments of track systems of the present technology to be efficiently mechanically packaged, in embodiments where such is judged to be important.

In some embodiments of the track system of the present technology, the endless track has leading, trailing and ground engaging segments. A first angle is formed between the trailing and ground engaging segments, and a second angle is formed between the leading and ground engaging segments. The first angle has a bisector, and the bisector of the first angle passes below the pitch pivot axis. In some embodiments of track systems of the present technology, this feature may assist in causing a torque to be generated that reduces the tendency of the track system to have a negative pitch. A negative pitch of the track system may cause the track system to sink or dig in the ground instead of travelling on the ground surface under certain conditions. In some embodiments, the torque generated may facilitate the track system to get out of situations where it would be bogged down or sank otherwise. In some embodiments, the first angle can vary by reconfiguring components of the track system to modify the torque generated.

In some embodiments of the track system of the present technology, the frame assembly is a multi-member frame assembly including a leading frame member pivotably connected to the attachment assembly via the second pivot for pivoting about the pitch pivot axis, and a trailing frame member pivotably connected to the attachment assembly via the second pivot for pivoting about the pitch pivot axis. The trailing frame member pivots independently from the leading frame member. The at least one wheel-bearing frame member is a leading wheel-bearing frame member and a trailing wheel-bearing frame member. The leading wheel-bearing frame member is at least indirectly pivotably connected to the leading frame member. The trailing wheel-bearing frame member is at least indirectly pivotably connected to the trailing frame member. The track system further includes a damper interconnecting the leading frame member and the trailing frame member. Yet in some other embodiments, the endless track has an amount of ground contact area that increases as a load borne by the track system increases. The leading and trailing frame members of such embodiments of the track system of the present technology define a somewhat scissor-like structure, with each frame member pivoting about the second pivot, and the damper interconnected therebetween. Each one of the leading and trailing wheel-bearing members is in turn pivotably connected to the leading or trailing frame member, respectively. The pivoting of each of these structures, along with the damper, may assist in reducing the vertical displacements and vibrations transferred to the chassis under certain conditions.

In addition, having a track system with a scissor-like structure may have other advantages in different situations. For example, as the weight of the vehicle increases, for instance during harvesting operations, the scissor-like structure can open and the ground-contacting portion of the endless track occurs over an increased surface area (i.e. the ground contacting area can increase in size as the load borne by the track system increases—at least for some increases in load—depending on the design of a specific track system). As a result, in some circumstances, the pressure applied to the ground by the endless track (owing to the weight of the vehicle) increases at a lower rate than the weight of the vehicle. In certain embodiments, this will allow a track system of the present technology to bear additional loads as compared with conventional track systems, while attempting to minimize soil compaction.

In some embodiments of the track system of the present technology, the vehicle has a drive shaft extending laterally outwardly of the chassis, and the track system has a sprocket wheel operatively connected to the drive shaft for driving the endless track. In the context of the present technology, the "drive shaft" of the vehicle should be understood to be the vehicle drivetrain component that ultimately transmits rotational forces generated by the engine to the ground engaging assembly of the vehicle (e.g. the vehicle's wheel assembly when such is mounted on the vehicle, or the vehicle's track system when such is mounted on the vehicle, etc.).

In some embodiments of the track system of the present technology, the damper is located outwardly of the sprocket wheel. This feature allows the damper to have a relatively long stroke. As a result, the damping action of the damper is generally more refined than in conventional track systems where the stroke of the damper is shorter. Such configuration provides for a smoother damping action of the damper and may reduce the risks of fully compressing the damper. This feature may also assist in allowing embodiments of track systems of the present technology to be efficiently mechanically packaged, in embodiments where such is judged to be important.

In some embodiments of the track system of the present technology, a load supported by the trailing wheel-bearing frame member is greater than a load supported by the leading wheel-bearing frame member. This feature may also assist in causing in some embodiments of track systems of the present technology a torque to be generated that reduces the tendency of the track system to have a negative pitch.

In accordance with another aspect of the present technology, there is provided a track system for use with a vehicle having a chassis. The track system includes an attachment assembly connectable to the chassis of the vehicle, the attachment assembly including a multi-pivot assembly having a first pivot extending longitudinally and defining a roll pivot axis of the track system, and a second pivot extending laterally and defining a pitch pivot axis of the track system. The track system has a frame assembly disposed laterally outwardly from the attachment assembly and connected to the attachment assembly, the frame assembly including at least one wheel-bearing frame member. The track system further has at least one actuator connected between the attachment assembly and the frame assembly for pivoting the frame assembly about the roll pivot axis, a leading idler wheel assembly at least indirectly connected to the at least one wheel-bearing frame member, a trailing idler wheel assembly at least indirectly connected to the at least one wheel-bearing frame member, at least one support wheel assembly at least indirectly connected to the at least one wheel-bearing frame member and disposed between the leading idler wheel assembly and the trailing idler wheel assembly, and an endless track extending around the leading idler wheel assembly, the trailing idler wheel assembly, and the at least one support wheel assembly.

In some embodiments, the multi-pivot assembly further includes a third pivot extending vertically and defining a yaw pivot axis of the track system, the frame assembly being further pivotable about the yaw pivot axis upon operation of the at least one actuator.

In some embodiments, the multi-pivot assembly includes a yoke, a pivot arm pivotally connected to the yoke by the first pivot and pivoting about the roll pivot axis, a plate connected to the pivot arm by the third pivot and pivoting about the yaw pivot axis, the second pivot projecting from the plate, and the plate being pivotable about the roll and yaw pivot axes relative to the yoke.

In some embodiments, the at least one actuator is a first, second and third actuators, the first actuator being operable for pivoting the frame assembly about the roll pivot axis, and the second and third actuators being operable for pivoting the frame assembly about the yaw pivot axis.

In some embodiments, the second actuator is a leading tracking actuator located forward of the second pivot, and the third actuator is a trailing tracking actuator located rearward of the second pivot.

In some embodiments, the frame assembly is a multi-member frame assembly including a leading frame member pivotably connected to the attachment assembly via the second pivot for pivoting about the pitch pivot axis, a trailing frame member pivotably connected to the attachment assembly via the second pivot for pivoting about the pitch pivot axis, the trailing frame member pivoting independently from the leading frame member. The at least one wheel-bearing frame member is a leading wheel-bearing frame member and a trailing wheel-bearing frame member, the leading wheel-bearing frame member being at least indirectly pivotably connected to the leading frame member, the trailing wheel-bearing frame member being at least indirectly pivotably connected to the trailing frame member. The track system further includes a damper interconnecting the leading frame member and the trailing frame member.

In some embodiments, the endless track has an amount of ground contact area that increases as a load borne by the track system increases.

In some embodiments, the vehicle has a drive shaft extending laterally outwardly of the chassis, and the track system further has a sprocket wheel at least indirectly connected to the drive shaft for driving the endless track.

In some embodiments, a load supported by the trailing wheel-bearing frame member is greater than a load supported by the leading wheel-bearing frame member.

In some embodiments, the track system further includes at least one monitoring sensor for determining, at least indirectly, at least one of a state of the track system and a ground surface condition, and a track system controller communicating with the at least one monitoring sensor for receiving a first signal indicative of the at least one of the state of the track system and the ground surface condition. The track system controller is configured to connect to and to control the operation of the at least one actuator based on the at least one of the state of the track system and the ground surface condition.

In some embodiments, the at least one monitoring sensor includes at least one of a load sensor, temperature sensor, accelerometer, strain gauge, fluid property sensor, inclinometer, actuator assembly position sensor, geographical location sensor, hygrometer, penetrometer, sonar device, ultrasonic device, microwave-based device, radar device, and lidar device.

In some embodiments, the track system controller controls the operation of the at least one actuator in response to a second signal received from a manual override, a master control unit mounted to the vehicle, a remote processing unit, or a remote master control unit.

In some embodiments, the track system controller controls the operation of the at least one actuator in accordance with a predetermined objective.

In some embodiments, the predetermined objective is distributing a load supported by the track system across a surface of a ground engaging segment of the endless track for at least one of reducing soil compaction and improving traction of the endless track.

In some embodiments, the track system further includes at least one idler actuator for adjusting the pivotal positioning of at least one of the leading and trailing idler wheel assemblies relative to the frame assembly including raising the at least one of the leading and trailing idler wheel assemblies to reduce an amount of endless track in flat ground contact and lowering the at least one of the leading and trailing idler wheel assemblies to increase the amount of endless track in flat ground contact, and the track system controller is further configured to connect to and to control the operation of the at least one idler actuator based on the at least one of the state of the track system and the ground surface condition.

There is also provided a vehicle having first and second track systems as described above, wherein the track system controller of the first track system is at least indirectly connected to the track system controller of the second track system, and the track system controller of the first track system controls the operation of the at least one actuator of the first track system based on at least one of the state of the second track system and the ground surface condition determined by the at least one monitoring sensor of the second track system.

In accordance with yet another aspect of the present technology, there is provided a track system for use with a vehicle having a chassis and a driveshaft extending laterally outwardly from the chassis, the track system including an attachment assembly connectable to the chassis of the vehicle and defining a pitch pivot axis, a frame assembly disposed laterally outwardly from the attachment assembly and connected to the attachment assembly, the frame assembly being pivotable about the pitch pivot axis, the frame assembly including at least one wheel-bearing frame member, a leading idler wheel assembly at least indirectly connected to the at least one wheel-bearing frame member, a trailing idler wheel assembly at least indirectly connected to the at least one wheel-bearing frame member, at least one support wheel assembly at least indirectly connected to the at least one wheel-bearing frame member and disposed between the leading idler wheel assembly and the trailing idler wheel assembly, an endless track extending around the leading idler wheel assembly, the trailing idler wheel assembly, and the at least one support wheel assembly, a sprocket wheel at least indirectly connected to the drive shaft for driving the endless track, and at least one idler actuator for adjusting the pivotal positioning of at least one of the leading and trailing idler wheel assemblies relative to the frame assembly including raising the at least one of the leading and trailing idler wheel assemblies to reduce an amount of endless track in flat ground contact and lowering the at least one of the leading and trailing idler wheel assemblies to increase the amount of endless track in flat ground contact. In the track system, a first torque is applied to the frame assembly about the pitch pivot axis when the at least one of the leading and trailing idler wheel assemblies is lowered, and a second torque being greater in magnitude than the first torque is applied to the frame assembly about the pitch pivot axis when the at least one of the leading and trailing idler wheel assemblies is raised.

In some embodiments, a load supported by the trailing wheel-bearing frame member is greater than a load supported by the leading wheel-bearing frame member.

In some embodiments, the track system further has at least one monitoring sensor for determining, at least indirectly, at least one of a state of the track system and a ground surface condition and a track system controller communicating with the at least one monitoring sensor for receiving a signal indicative of the at least one of the state of the track system and the ground surface condition. The track system controller is configured to connect to and to control the operation of the at least one idler actuator based on the at least one of the state of the track system and the ground surface condition.

There is also provided a vehicle having first and second track systems as described above, wherein the track system controller of the first track system is at least indirectly connected to the track system controller of the second track system, and the track system controller of the first track system controls the operation of the at least one idler actuator of the first track system based on the at least one of the state of the second track system and the ground surface condition determined by the at least one monitoring sensor of the second track system.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 17C is a top plan, schematic view of the vehicle of FIG. 17A, further including a communication device and a remote master control unit.

DETAILED DESCRIPTION

Introduction

With reference to FIGS. 1 to 14, an embodiment of the present technology, track system 40, is illustrated. It is to be expressly understood that the track system 40 is merely an embodiment of the present technology. Thus, the description thereof that follows is intended to be only a description of illustrative examples of the present technology. This description is not intended to define the scope or set forth the bounds of the present technology. In some cases, what are believed to be helpful examples of modifications or alternatives to track system 40 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where a modification has not been done (i.e. where no examples of modifications have been set forth), it should not be interpreted that no modifications are possible and/or that what is described is the sole manner of implementing or embodying that element of the present technology. As a person skilled in the art would understand, this is likely not the case. In addition, it is to be understood that the track system 40 may provide in certain aspects a simple embodiment of the present technology, and that where such is the case it has been presented in this manner as an aid to understanding. As a person skilled in the art would understand, various embodiments of the present technology may be of a greater complexity than what is described herein.

Figure 2:
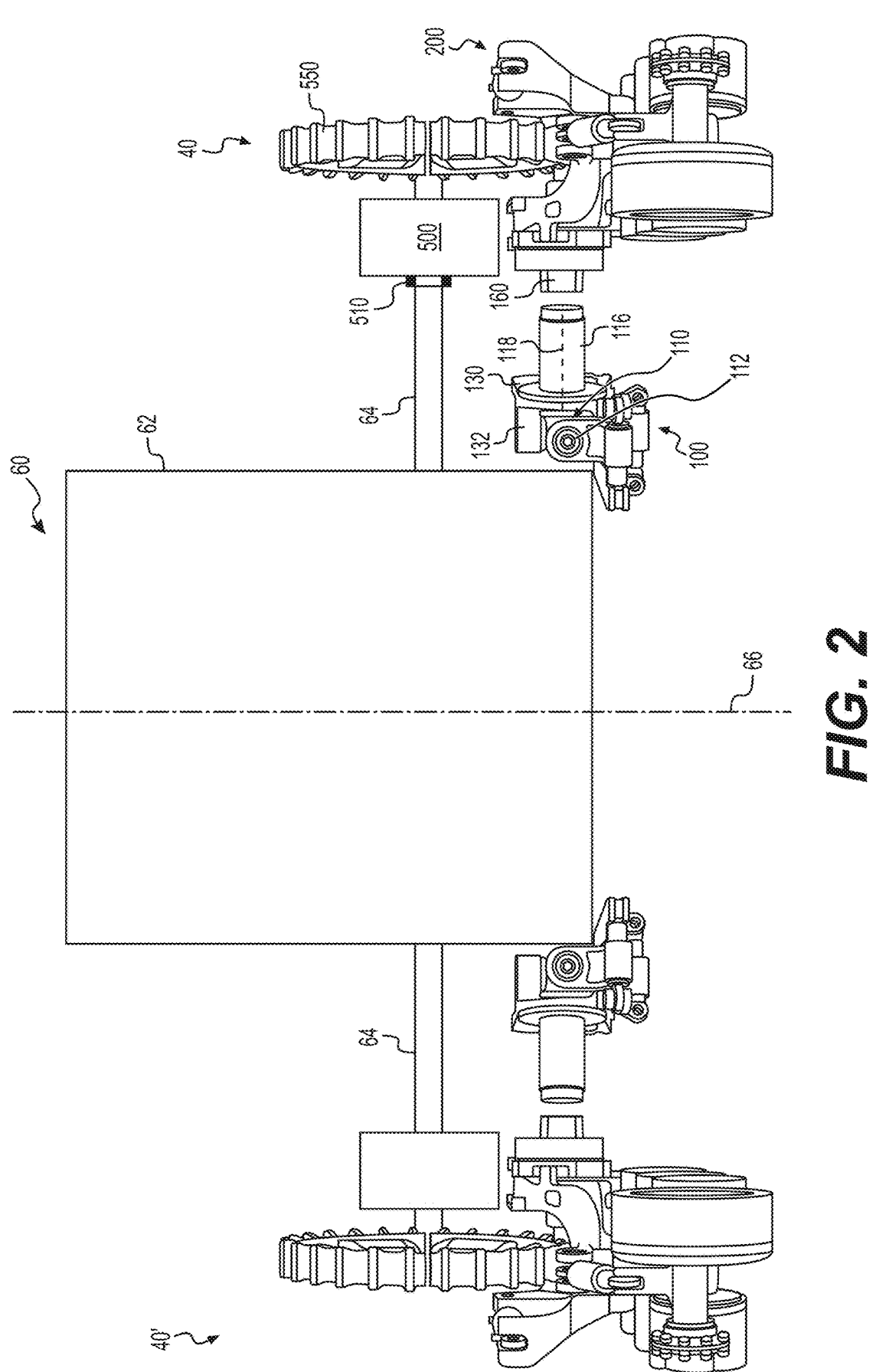
FIG. 2 is a partially exploded, rear elevation view of a vehicle having the track system of FIG. 1 operatively connected to the right side thereof, and another track system being a mirror image of the track system of FIG. 1 operatively connected to the left side thereof.

Referring to FIG. 2, the track system 40 is for use with a vehicle 60 having a chassis 62 and a drive shaft 64 extending laterally outwardly from the chassis 62 for driving the track system 40 (the vehicle 60, the chassis 62 and the drive shaft 64 are schematically shown in FIG. 2). The chassis 62 supports various components of the vehicle 60, such as the cabin, the engine, the gearbox and other drivetrain components (not shown). In this embodiment, the drive shaft 64 is the drivetrain component that transmits the driving force from the engine and gearbox of the vehicle 60 to the track system 40, i.e. the drive shaft 64 is the output shaft of the gearbox.

In the context of the following description, "outwardly" or "outward" means away from a longitudinal center plane 66 of the chassis 62 of the vehicle 60, and "inwardly" or "inward" means towards the longitudinal center plane 66. In addition, in the context of the following description, "longitudinally" means in a direction parallel to the longitudinal center plane 66 of the chassis 62 of the vehicle 60 in a plane parallel to flat level ground, "laterally" means in a direction perpendicular to the longitudinal center plane 66 in a plane parallel to flat level ground, and "generally vertically" means in a direction contained in the longitudinal center plane 66 along a height direction of the track system 40 generally perpendicular to flat level ground. Note that in the accompanying Figures, a "+" symbol is used to indicate an axis of rotation. In the context of the present technology, the term "axis" may be used to indicate an axis of rotation, or the term may refer to a "pivot joint" that includes all the necessary structure (bearing structures, pins, axles and other components) to permit a structure to pivot about such axis, as the case may be. Moreover, the direction of forward travel of the track system 40 is indicated by an arrow 80 in FIG. 1. In the present description, the "leading" components are identified with a letter "l" added to their reference numeral (i.e. components towards the front of the vehicle 60 defined consistently with the vehicle's forward direction of travel 80), and the "trailing" components are identified with a letter "t" added to their reference numeral (i.e. components towards the rear of the vehicle 60 defined consistently with the vehicle's forward direction of travel 80). In the following description and accompanying Figures, the track system 40 is configured to be attached to a right side of the chassis 62 of the vehicle 60. A track system 40' (FIG. 2), being another embodiment of the present technology and configured to be connected to a left side of the chassis 62 of the vehicle 60, is a mirror image of the track system 40 with the necessary adaptations, and the components of the track system 40' are identified with a "'" added to their reference numeral. That embodiment will not be further described herein.

General Description of the Track System

Referring to FIGS. 1 to 6, the track system 40 will be generally described. The track system 40 includes an attachment assembly 100 connectable to the chassis 62 of the vehicle 60. The attachment assembly 100 includes a multi-pivot assembly 110 having a longitudinally extending pivot 112. The pivot 112 defines a roll pivot axis 114 of the track system 40. The multi-pivot assembly 110 further has a pivot 116 extending laterally outwardly. The pivot 116 defines a pitch pivot axis 118 of the track system 40.

The track system 40 further includes a frame assembly 200 disposed laterally outwardly from the attachment assembly 100 (FIG. 2) and connected thereto. The frame assembly 200 is a multi-member frame assembly and includes a leading frame member 210l pivotably connected to the attachment assembly 100 via the pivot 116 for pivoting about the pitch pivot axis 118 (FIG. 1), and a trailing frame member 210t pivotably connected to the attachment assembly 100 via the pivot 116 for pivoting about the pitch pivot axis 118 (FIG. 1) independently from the leading frame member 210l. The multi-member frame assembly 200 also includes a leading wheel-bearing frame member 230t pivotably connected to a lower portion 222l of the leading frame member 210t. The leading wheel-bearing frame member 230l pivots about a pivot axis 224t. The multi-member frame assembly 200 further includes a trailing wheel-bearing frame member 230t pivotably connected to a lower portion 222t of the trailing frame member 210t. The trailing wheel-bearing frame member 230t pivots about a pivot axis 224t. A trailing support wheel assembly 250 is pivotably connected to the trailing wheel-bearing frame member 230t about an axis 252. The track system 40 further includes a damper 300 (in this embodiment a shock absorber) interconnecting the leading frame member 210l and the trailing frame member 210t.

A leading idler wheel assembly 400l is rotatably connected to the leading wheel-bearing frame member 230l, and a trailing idler wheel assembly 400t is rotatably connected to the trailing wheel-bearing frame member 230t. A plurality of support wheel assemblies 410a, 410b, 410c are disposed between the leading idler wheel assembly 400l and the trailing idler wheel assembly 400t. The support wheel assemblies 410a, 410b, 410c assist in distributing the load born by the track system 40 across the endless track 600 of the track system 40. The support wheel assembly 410a is rotatably connected to the leading wheel-bearing frame member 230l. The support wheel assemblies 410b, 410c are rotatably connected to the trailing support wheel assembly 250. In other embodiments, it is contemplated that there could be more or less support wheel assemblies 410a, 410b, 410c.

Still referring to FIGS. 1 to 6, the track system 40 further includes a gearbox 500 (schematically shown in FIG. 2) operatively connected to the drive shaft 64 of the vehicle 60. The drive shaft 64 is operatively connected to the gearbox 500 via a universal joint 510, but could be operatively connected otherwise. The track system 40 further includes a sprocket wheel 550 operatively connected to the gearbox 500. It is noted that in the present embodiment, the drive shaft 64 of the vehicle 60 does not bear a material portion of the weight of the vehicle 60 but only transmits driving forces to the gearbox 500 which does not bear a material portion of the weight of the vehicle 60 either. In other embodiments, the gearbox 500 could be omitted and the drive shaft 64 could be directly connected to the sprocket wheel 550. In such embodiments, the drive shaft 64 could be an axle of the vehicle 60 on which a tire and wheel assembly could be connected should a wheeled configuration be preferred to a configuration with track systems. Other embodiments of the track system 40 could be designed to be used on a vehicle and not be meant to be driven by a drive shaft 64. For example, other embodiments of the track system 40 could be configured to be operatively connected to a towed vehicle, and thus such embodiments of the track system 40 would have no sprocket wheel 550. In such embodiments the track system could have a generally rectangular shape instead of the generally triangular shape of the track system 40 illustrated in the accompanying Figures.

Endless Track

The track system 40 further includes the endless track 600 (FIG. 1) which extends around the sprocket wheel 550, the leading idler wheel assembly 400l, the trailing idler wheel assembly 400t, and the plurality of support wheel assemblies 410a, 410b, 410c. The endless track 600 is drivable by the sprocket wheel 550.

The endless track 600 is an endless polymeric track. The endless track 600 has an inner surface 602 engaging the leading idler wheel assembly 400l, the trailing idler wheel assembly 400t, and the plurality of support wheel assemblies 410a, 410b, 410c. Lugs 604 (FIG. 18) are disposed on a central portion of the inner surface 602 and are engageable by the sprocket wheel 550. As such, the track system 40 is a "positive drive" track system. Friction drive track systems are also contemplated as being an alternative to the present embodiment. The idler and support wheel assemblies 400l, 400t, 410a, 410b, 410c have laterally spaced-apart wheels (FIGS. 5 and 6) engaging the inner surface 602 of the endless track 600 on either side of the lugs 604 to prevent the endless track 600 to slide off. The endless track 600 also has an outer surface 606 with a tread 608 (FIGS. 4A and 4B) selected for ground engagement. The tread 608 varies in different embodiments according to the type of vehicle on which the track system 40 is to be used with and/or the type of ground surface on which the vehicle is destined to travel. It is contemplated that within the scope of the present technology, the endless track 600 may be constructed of a wide variety of materials and structures including metallic components known in track systems.

Figure 7:
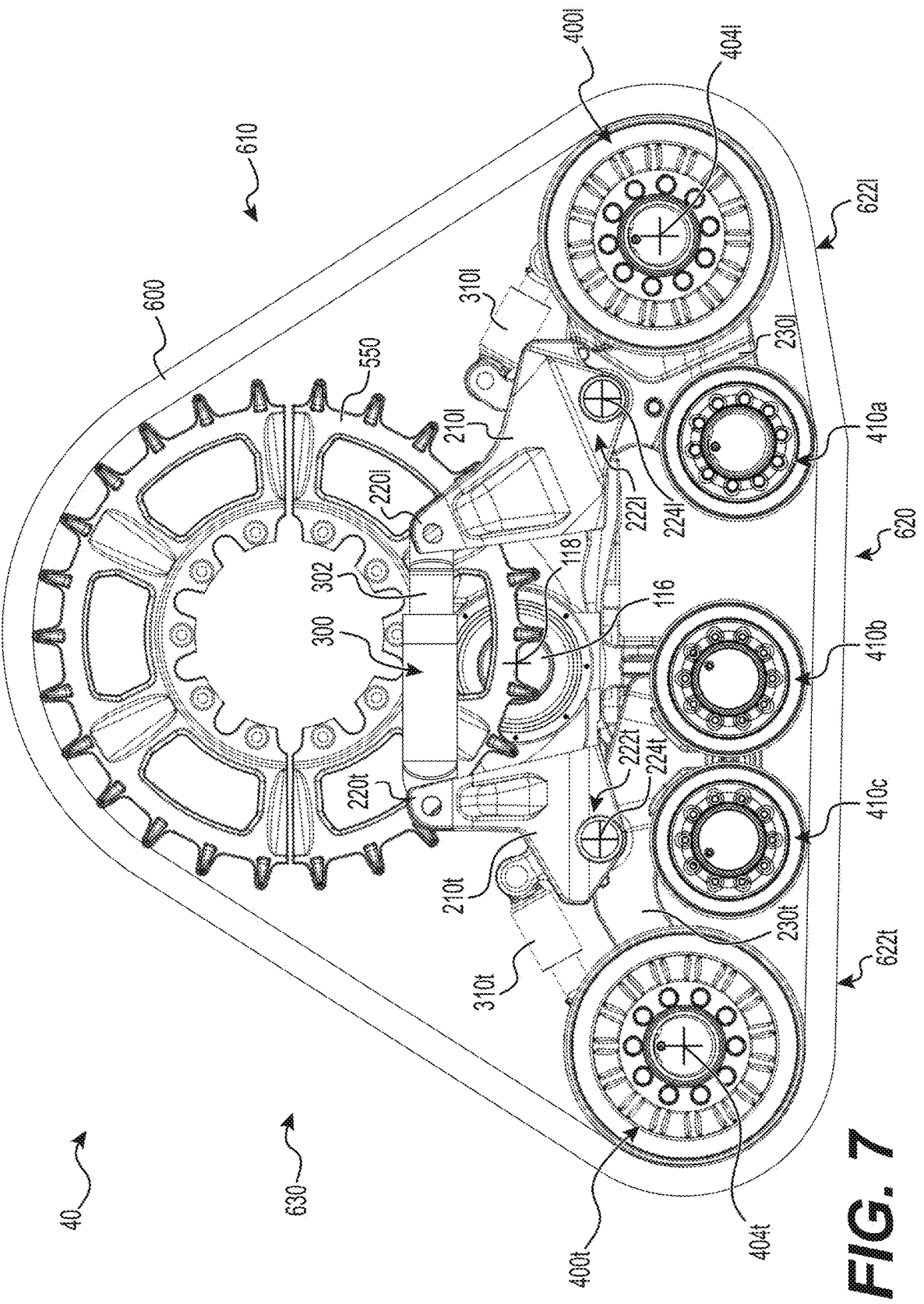
FIG. 7 is a right side elevation view of the track system of FIG. 1, with the leading idler wheel assembly raised.
Figure 8:
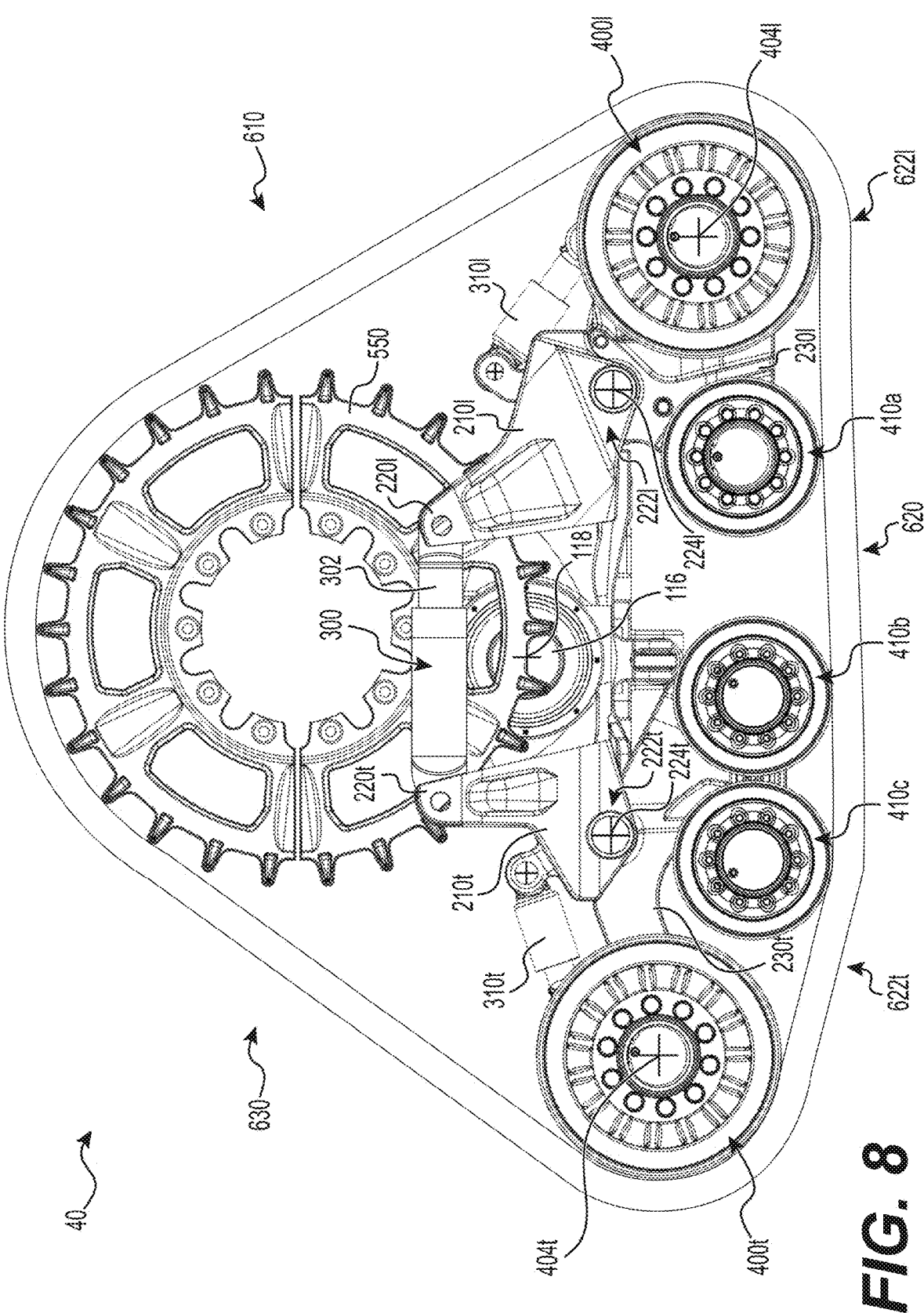
FIG. 8 is a right side elevation view of the track system of FIG. 1, with the trailing idler wheel assembly raised.

Referring to FIGS. 7 and 8, the endless track 600 has a leading segment 610, a ground engaging segment 620 and a trailing segment 630. As mentioned above, the generally triangular shape of the track system 40 causes the endless track 600 to have the segments 610, 620, 630, but as other configurations of the track system 40 are contemplated, the endless track 600 could have more or less segments in other embodiments. Referring to FIGS. 7 and 8 and as will be described below, the pivotal positioning of the leading idler wheel assembly 400*l* relative to the leading frame member 210*l* and the pivotal positioning of the trailing idler wheel assembly 400*t* relative to the trailing frame member 210*t* varies by raising or lowering the leading wheel-bearing frame member 230*l* and the trailing wheel-bearing frame member 230*t* respectively. When the leading wheel-bearing frame member 230*l* is raised (FIG. 7), the ground engaging segment 620 includes a leading ground-engaging segment 622*l* that extends above ground when the endless track 600 is disposed on flat level ground. The leading ground-engaging segment 622*l* extends below the leading idler wheel assembly 400*l*. It is contemplated that, in certain situations such as when the track system 40 travels on soft ground and compacts the medium forming the ground, the ground-engaging segment 622*l* could engage the ground surface.

Figure 10A:
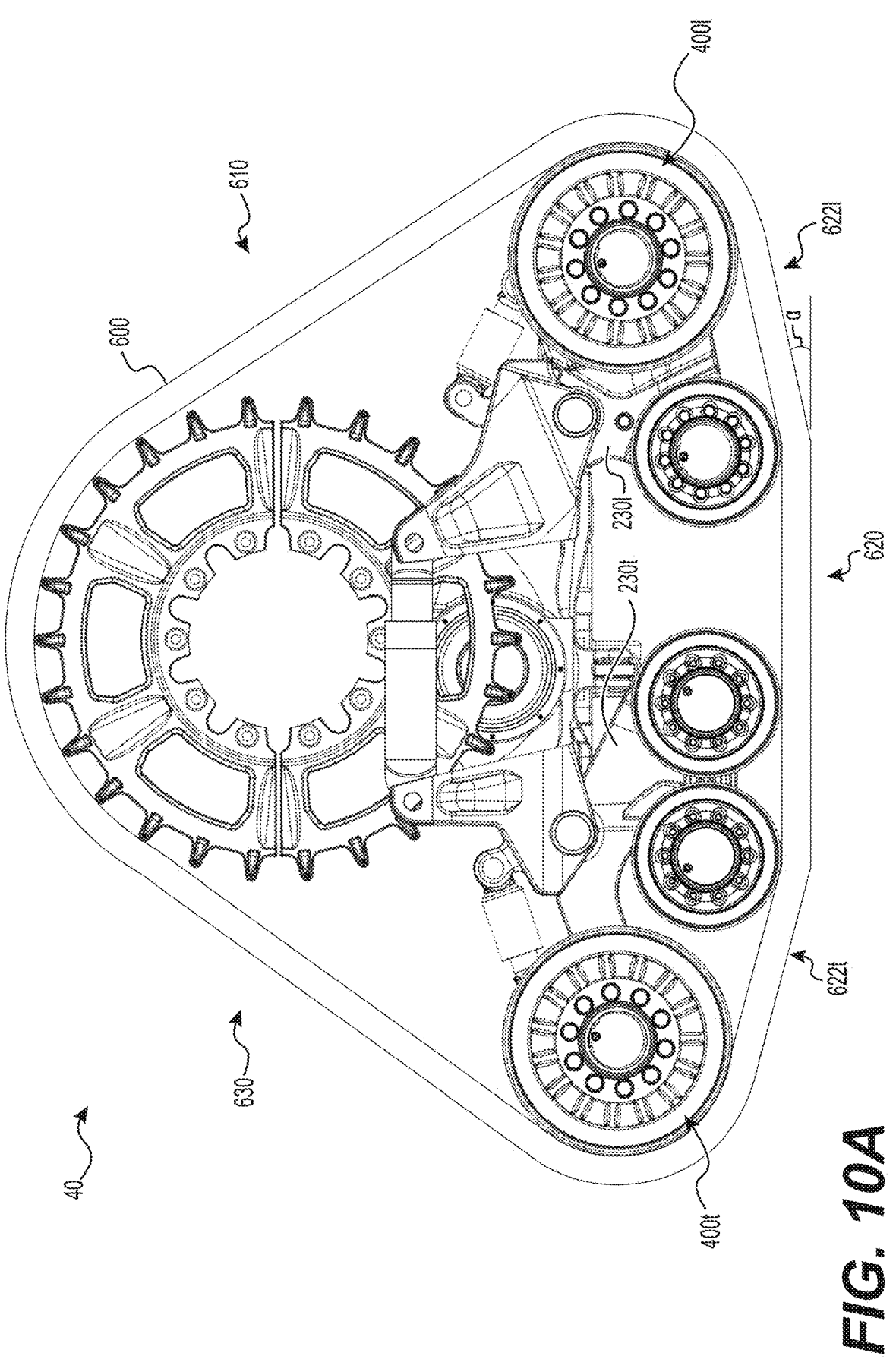
FIG. 10A is a right side elevation view of the track system of FIG. 1, with the leading and trailing idler wheel assemblies raised.

When the trailing wheel-bearing frame member 230*t* is raised (FIG. 8), the ground engaging segment 620 further includes a trailing ground engaging segment 622*t* that extends above ground when the endless track 600 is disposed on flat level ground. The trailing ground engaging segment 622*t* extends below the trailing idler wheel assembly 400*t*. It is also contemplated that, in certain situations such as when the track system 40 travels on soft ground and compacts the medium forming the ground, the ground-engaging segment 622*t* could engage the ground surface. Referring to FIG. 10A, when both the leading wheel-bearing frame member 230*l* and the trailing wheel-bearing frame member 230*t* are raised, the endless track 600 has the leading ground-engaging segment 622*l* and the trailing ground engaging segment 6221 extending above ground. In this configuration, the ground engaging segment 620 (i.e. the portion of the endless track 600 that engages the ground surface when the endless track 600 is disposed on flat level ground) is shorter compared to the ground engaging segment 620 of the configurations shown in FIGS. 1, 7 and 8.

Attachment Assembly

Figure 5:
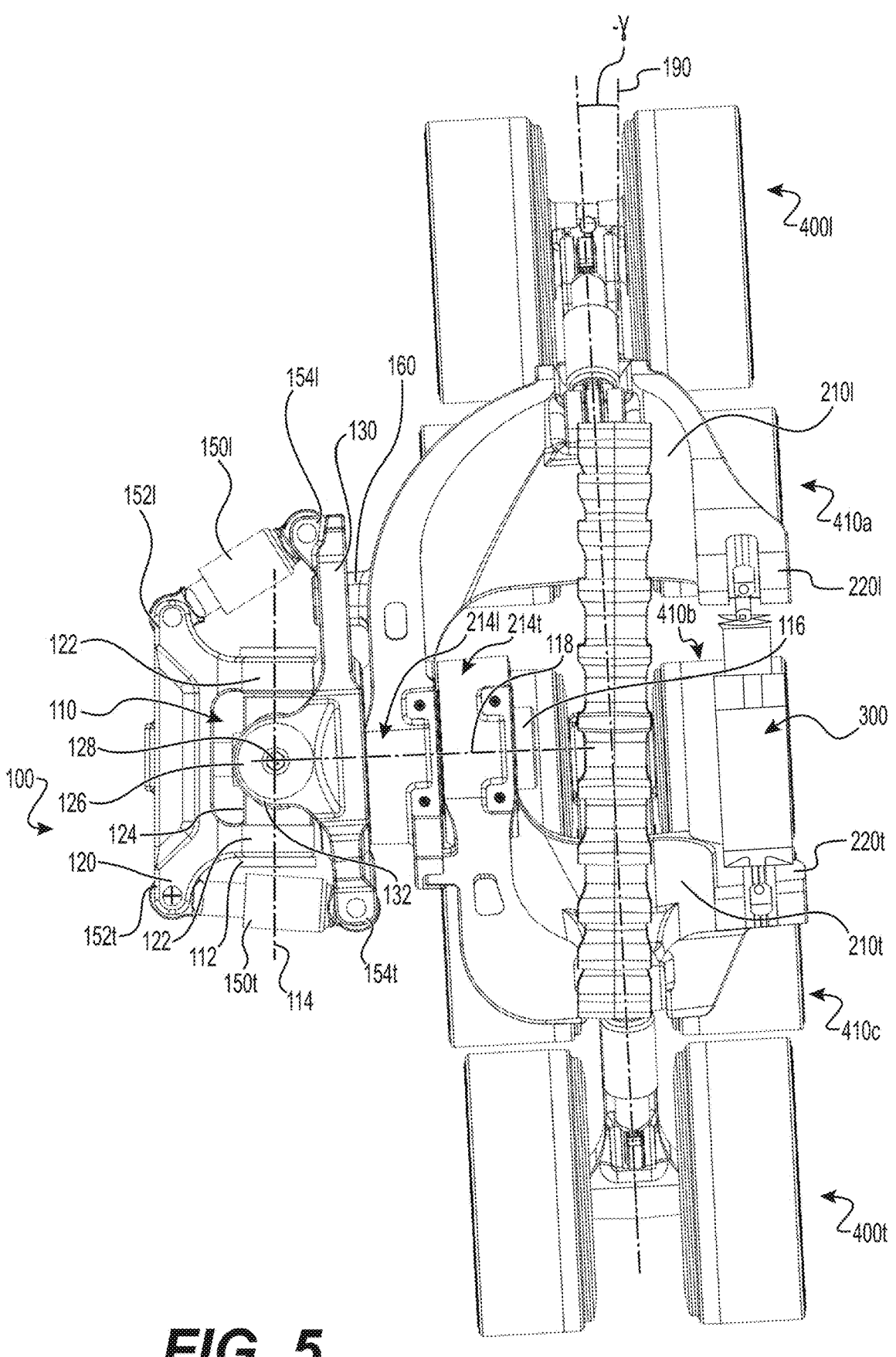
FIG. 5 is a top plan view of the track system of FIG. 1, with the endless track removed, and the frame assembly and wheel assemblies pivoted at a toe-in angle.
Figure 6:
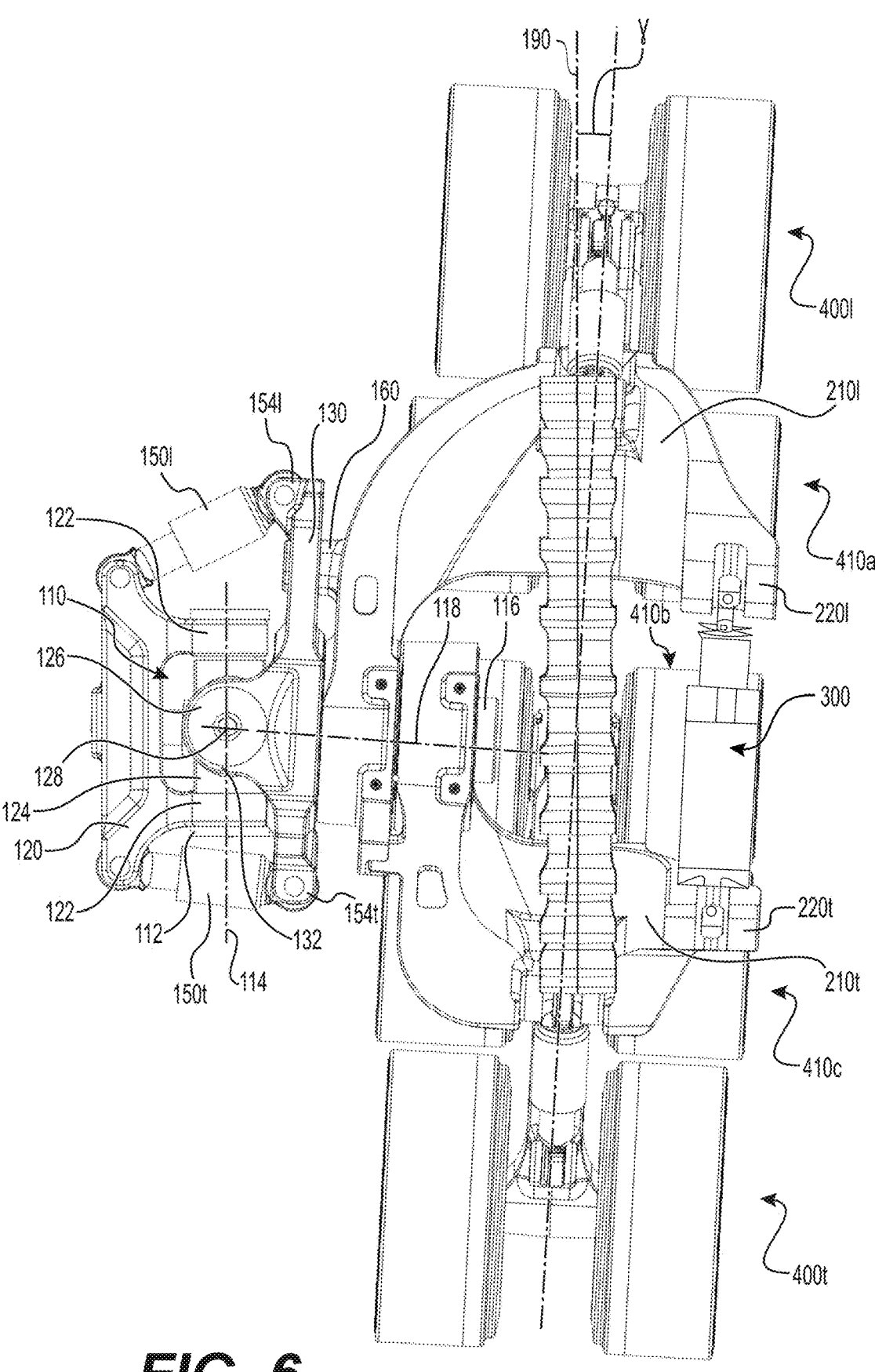
FIG. 6 is a top plan view of the track system of FIG. 5, with the frame assembly and wheel assemblies pivoted at a toe-out angle.

Turning back to FIGS. 2 to 6, the attachment assembly 100 will be described. The multi-pivot assembly 110 has a yoke 120. The yoke 120 is connected to the chassis 62 of the vehicle 60. In the present embodiment, the yoke 120 is connected to an underside of the chassis 62, but could be configured and structured to be connected to the chassis 62 otherwise. The yoke 120 has longitudinally spaced apart tabs 122 (FIGS. 5 and 6). The tabs 122 each define a hole (not shown) through which the longitudinally extending pivot 112 extends. A pivot arm 124 is pivotably connected to the tabs 122 of the yoke 120 by the longitudinally extending pivot 112. The pivot arm 124 is a cruciform member simultaneously connected to the pivot 112 and to a generally vertically extending pivot 126. The pivot 126 defines a yaw pivot axis 128 of the track system 40. The pivot arm 124 is further pivotably connected to a plate 130 having vertically spaced apart tabs 132 (only the top tab 132 is show). The tabs 132 each define a hole (not shown) through which the generally vertically extending pivot 126 extends. Through the pivot 126, the plate 130 is pivotable about the yaw pivot axis 128 relative to the pivot arm 124, and the plate 130 is thus pivotable relative to the yoke 120 about the roll and yaw pivot axes 114, 128. It is to be noted that, in the present embodiment, the yaw pivot axis 128 extends in a direction parallel to the longitudinal center plane 66 and along a height direction of the track system 40 that is perpendicular to flat level ground. In another embodiment, the yaw pivot axis 128 could extend not perpendicularly to flat level ground and could be skewed forward or rearward so as to define a positive or negative caster angle of the track system 40.

Figure 3A:
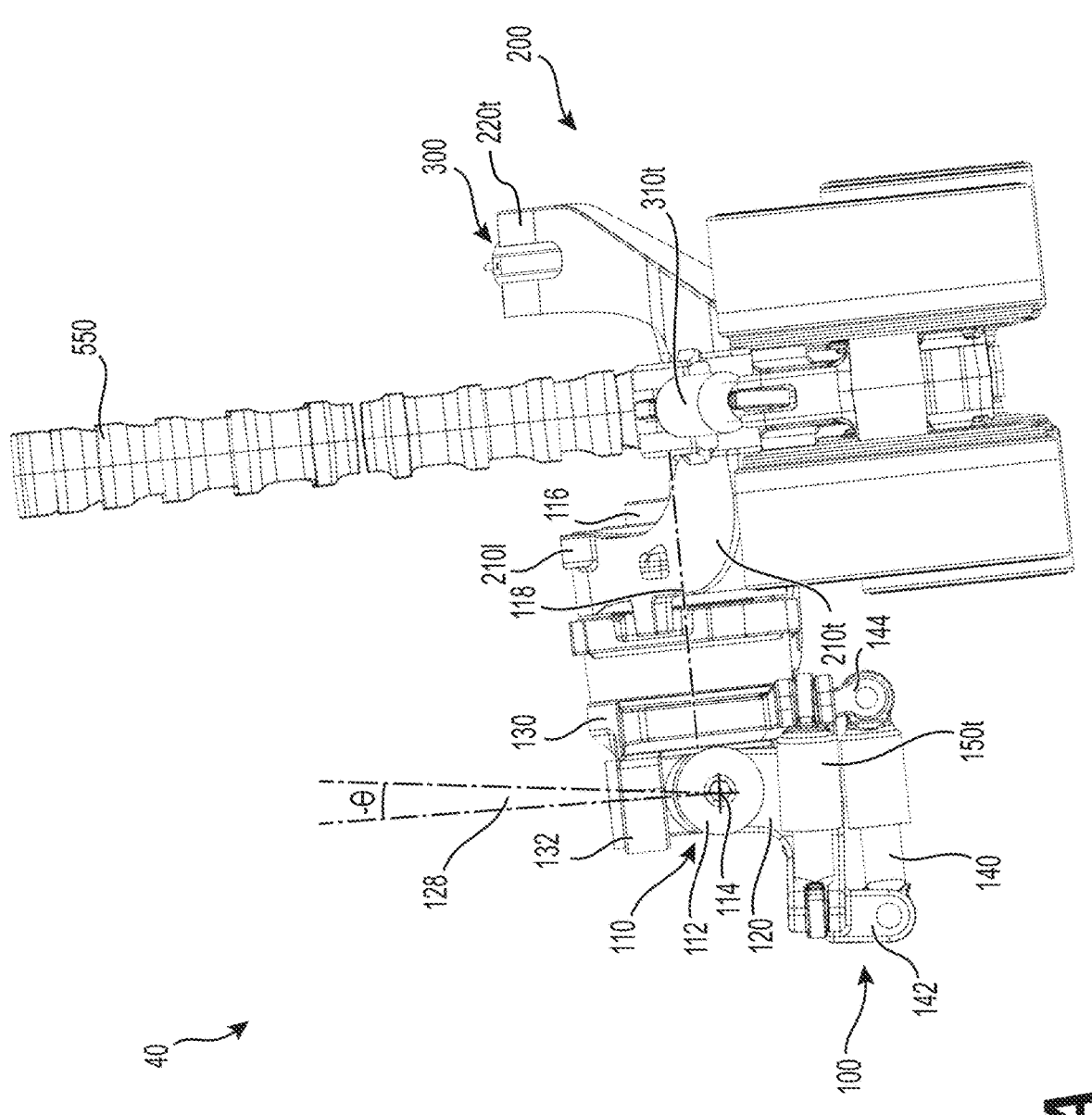
FIG. 3A is a rear elevation view of the track system of FIG. 1, with the endless track removed, and the frame assembly and wheel assemblies pivoted at a negative camber angle.
Figure 3B:
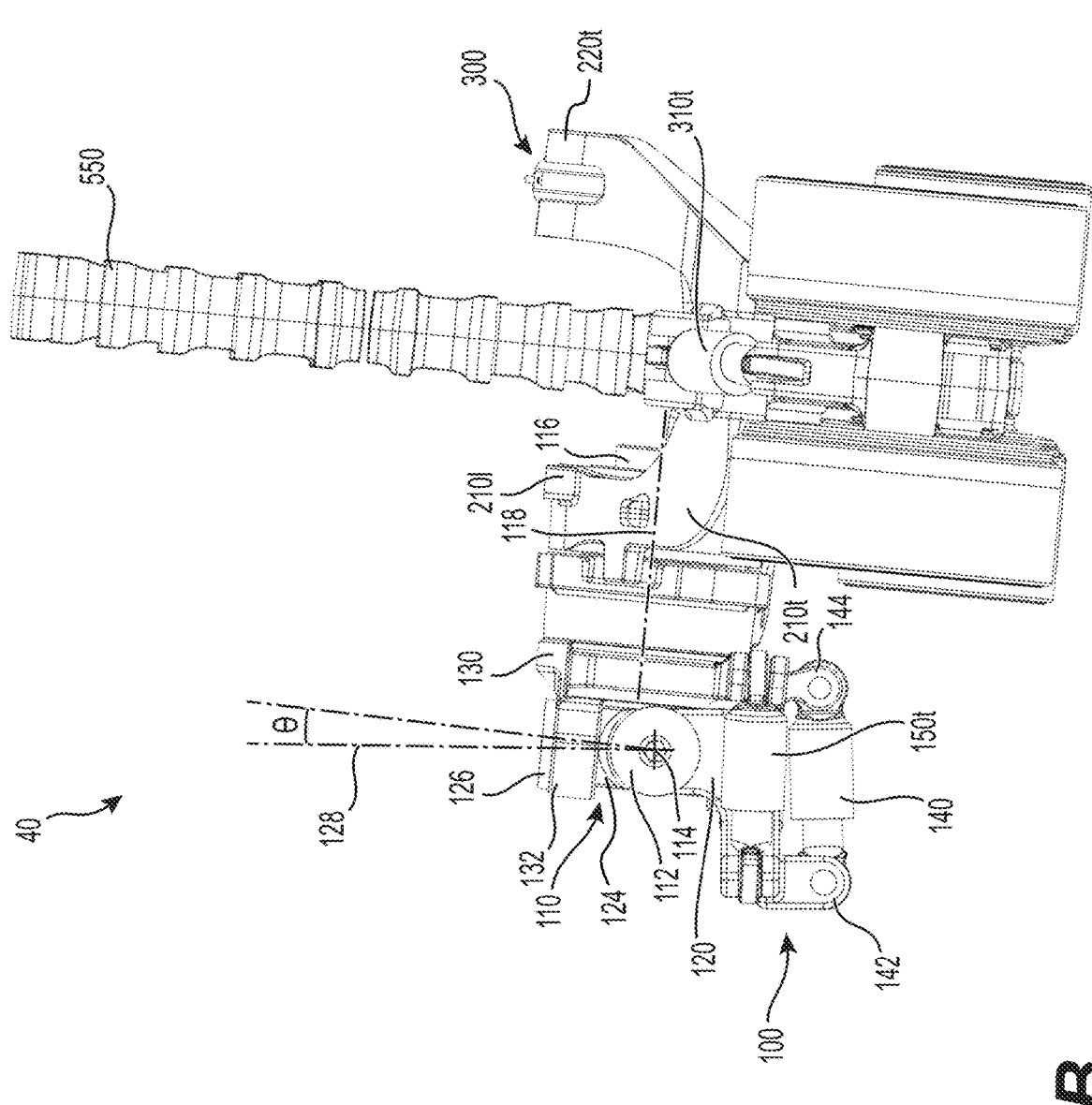
FIG. 3B is a rear elevation view of the track system of FIG. 3A, with the frame assembly and wheel assemblies pivoted at a positive camber angle.

As best seen in FIGS. 2 to 3B, the plate 130 has the pivot 116 projecting therefrom and extending laterally outwardly from the attachment assembly 100. The pivot 116 is connected to the outward face of the plate 130. The pivot 116 can be connected to the plate 130 using fasteners and/or any bonding techniques such as welding. In some embodiments, the pivot 116 is integrally formed with the plate 130. Loads on the chassis 62 of the vehicle 60 (including the vehicle's weight) are transferred to the plate 130 via the yoke 120 when connected to the chassis 62. Loads are then transferred to the pivot 116 and then to the leading and trailing frame members 210*l*, 210*t*, and so on.

As will be described in more details below, the roll, pitch and yaw pivot axes 114, 118, 128 permit degrees of freedom of the track system 40 relative to the chassis 62 of the vehicle 60 that can assist the endless track 600 to better conform to the ground surface on which it travels and in turn distribute more evenly the load on the entire surface of the ground engaging segment 620 of the endless track 600.

Referring to FIGS. 3A to 4B, the attachment assembly 100 further has a camber angle adjusting actuator 140 operatively connected between downwardly projecting tabs 142 of the yoke 120 and downwardly projecting tabs 144 of the plate 130. The camber angle adjusting actuator 140 is thus downwardly offset of the pivot axes 114, 118. The actuator 140 is a telescopic linear actuator. Referring to FIGS. 3A and 3B, retraction and extension of the actuator 140 causes pivoting of the frame assembly 200 and wheels 400*l*, 400*t*, 410*a*, 410*b*, 410*c* about the roll pivot axis 114 so as to adopt a negative camber angle −θ (FIG. 3A) or a positive camber angle θ (FIG. 3B). In some embodiments, the camber angle adjusting actuator 140 can provide for camber angle adjustment of up to about 10 degrees, that is angle θ equals to about 10 degrees, but larger or smaller angles θ are contemplated in different embodiments.

As best seen in FIG. 3A, extension of the actuator 140 causes the track system 40 to adopt a negative camber angle −θ. Conversely and as seen in FIG. 3B, retraction of the actuator 140 causes the track system 40 to adopt a positive camber angle θ. As such, the track system 40 has a range of roll motion about the pivot axis 114 from about −10 degrees to 10 degrees for adjusting the camber angle of the track system 40. The degree of freedom in roll motion about the pivot axis 114 permits the track systems 40, 40' to better conform to a ground surface which is inclined laterally and that defines, for example, a crowned road or a shallow ditch.

As such, the load supported by the frame assembly 200 is more evenly distributed between the inward and outward wheels of the idler and support wheel assemblies 400*l*, 400*t*, 410*a*, 410*b*, 410*c*. This more even distribution of the load can reduce wear of the endless track 600 as a majority of the area of the ground engaging segment 620 is in ground contact, and not just and area below the inward or outward wheels. Wear of the bearings and axle assemblies of each one of the idler and support wheel assemblies 400*l*, 400*t*, 410*a*, 410*b*, 410*c* is also reduced compared to track systems that do not have a degree of freedom in roll motion.

Figure 4B:
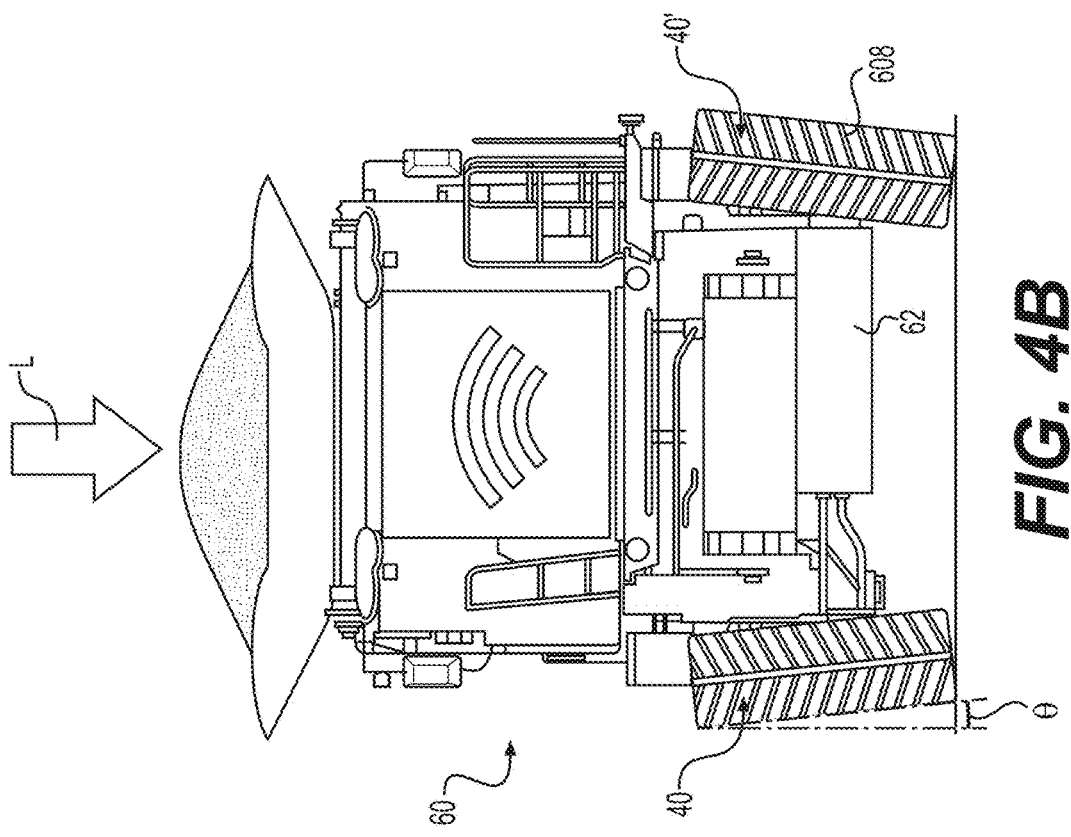
FIG. 4B is a front elevation view of the vehicle of FIG. 4A, with the vehicle bearing an increased load and the left and right track systems having a positive camber angle.
Figure 4A:
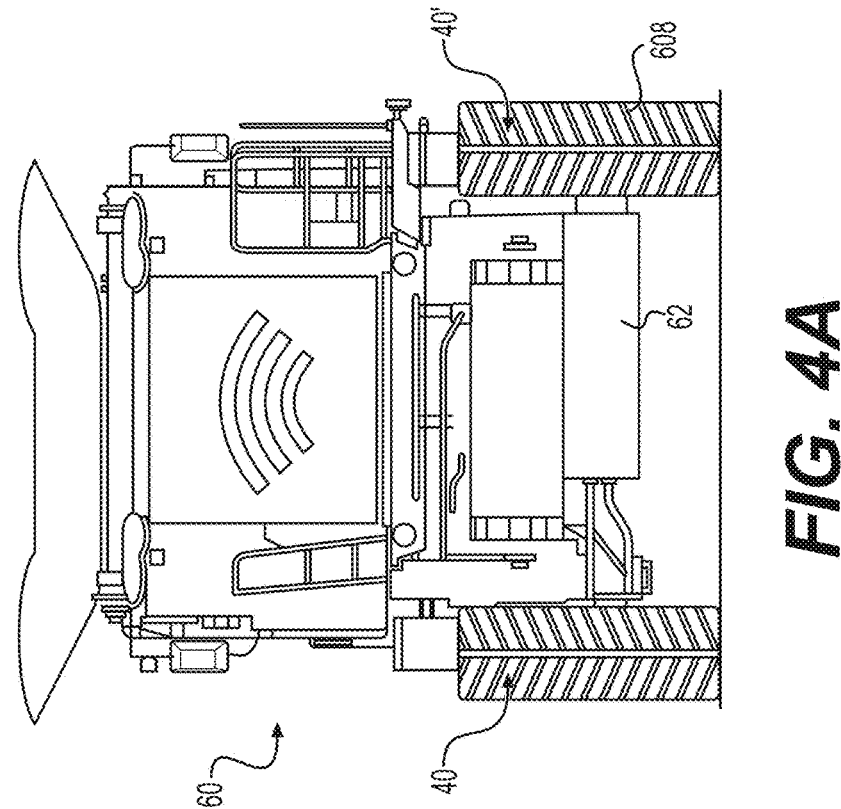
FIG. 4A is a front elevation view of the vehicle of FIG. 2 with the left and right track systems having a neutral camber angle.

Referring to FIGS. 4A and 4B, the actuator 140 can also be used for selective adjustment of the camber angle θ as a function of the load applied on the track system 40. For example, as a load L of the vehicle 60 increases, for example during harvesting or loading operations, the center portion of the chassis 62 deflects downwards under this increased load L, which would tilt the track systems 40, 40' at a negative camber angle −θ and causing the inward wheels of the wheel assemblies 400l, 400t, 410a, 410b, 410c to bear more load than the outward wheel assemblies. The actuator 140 can be selectively retracted so that the camber angle θ be adjusted to compensate for this deflection (i.e. θ is equal to about 0 degree, which corresponds to a neutral camber angle). As such, in certain circumstances, the load could be more evenly distributed across the ground engaging segment 620 of the endless track 600. It is to be noted that in FIG. 4B, the camber angle θ is not to scale and is represented for illustrative purposes. Thus, operation of the actuator 140 could allow the track system 40 to have a dynamically changing camber angle θ depending on, for example, ground surface conditions, temperature in certain portions of the endless track 600 and/or the load L born by the vehicle 60.

In other embodiments, the actuator 140 is replaced by a stepper motor or by any other devices capable of adjusting the positional relationship about the roll pivot axis 114 between the attachment assembly 100 and the frame assembly 200. Thus, the actuator 140 could be replaced by a stepper motor which could adjust the positional relationship by rotating the frame assembly 200 relative to the attachment assembly 100 about the roll pivot axis 114. Other suitable motors could be used in other embodiments.

Referring to FIGS. 5 and 6, the attachment assembly 100 further has a leading tracking adjusting actuator 150l operatively connected between forwardly projecting tabs 152l of the yoke 120 and forwardly projecting tabs 154l of the plate 130, and a trailing tracking adjusting actuator 150t operatively connected between rearwardly projecting tabs 152t of the yoke 120 and rearwardly projecting tabs 154t of the plate 130. The leading and trailing tracking adjusting actuators 150l, 150t are thus longitudinally offset of the pivot axis 118.

Referring to FIG. 5, retraction of the actuator 150l and extension of the actuator 150t cause pivoting of the track system 40 about the pivot axis 128 so as to adopt a toe-in angle −γ (i.e. the leading idler wheel assembly 400l is pivoted inwards and towards the chassis 62 of the vehicle 60) relative to a plane 190, which extends parallel to a longitudinal direction of the track system 40, parallel to the center plane 66 of the vehicle 60 and parallel to a height direction of the track system 40. Referring to FIG. 6, extension of the actuator 150l and/or retraction of the actuator 150t cause pivoting of the track system 40 about the pivot axis 128 so as to adopt a toe-out angle γ (i.e. the leading idler wheel assembly 400l is pivoted outwards and away from the chassis 62 of the vehicle 60) relative to the plane 190.

In some embodiments, the actuators 150l, 150t can provide for tracking angle adjustment of up to about 10 degrees, that is angle γ equals to about 10 degrees, but larger or smaller angles γ are contemplated in different embodiments. The degree of freedom in yaw motion about the pivot axis 128 permits the track systems 40, 40' to adjust the tracking angle and reduce wear of the endless track 600 in some conditions due to a misalignment of the track systems 40, 40'. Like the camber angle θ, the toe-in/toe-out angle γ can be dynamically changed using the actuators 150l, 150t when required, depending on, for example, temperature of certain portions of the endless track 600, ground surface conditions and the load L born by the vehicle 60. As such, premature wear of the endless track 600 and other components of the track system 40 is reduced compared to conventional track systems. Furthermore, as mentioned above, the selection of the toe-in/toe-out angle γ may also assist in preserving the integrity of the soil.

In addition, in another embodiment, the actuator 140 is omitted and the camber angle θ is adjustable by simultaneously retracting or extending the actuators 150l, 150t. For example, in such an embodiment, simultaneously extending the actuators 150l, 150t causes the track system 40 to adopt a negative camber angle −θ. Conversely, retracting the actuators 150l, 150t causes the track system 40 to adopt a positive camber angle θ. Thus, in such an embodiment, the actuators 150l, 150t are operable for selectively adjusting both the camber angle θ and the toe-in/toe-out angle γ of the track system 40.

Moreover, when the track systems 40 is steerable, for example when operatively connected to a steerable component of the chassis 62, the actuators 150l, 150t could be operatively connected to the steering system of the vehicle 60 so as to provide better steering control under some circumstances. For example, when the vehicle 60 is steered to the right, the actuator 150l is extended and the actuator 150t is retracted so as to assist the track system 40 to steer the vehicle 60 to the right.

Referring back to FIG. 2, a stop 160 projects inwardly from the leading frame member 210l and extends through an aperture 162 (seen in FIG. 10B) defined in the plate 130. In the present embodiment, the stop 160 is integrally formed with the leading frame member 210l, but they could be provided as separate components connected together in another embodiment. The stop 160 is structured and dimensioned to limit the pivotal motion of the leading frame member 210l about the pitch pivot axis 118. In some embodiments, the aperture 162 is arcuate and the center of the arc of the aperture 162 coincides with the pitch pivot axis 118. The stop 160 and/or the aperture 162 could be configured otherwise and limit the pivotal motion of the leading frame member 210l relative to the plate 130 to a lesser or greater extent than the one illustrated.

Leading and Trailing Frame Members

Referring now to FIGS. 3A to 8, the leading and trailing frame members 210l, 210t will be described. The leading and trailing frame members 210l, 210t are pivotably connected to the attachment assembly 100 as they are supported by the pivot 116. The leading and trailing frame members 210l, 210t are disposed laterally outwardly from the attachment assembly 100 (FIGS. 5 and 6). In order to facilitate the pivoting of the leading and trailing frame members 210l, 210t on the pivot 116, bearings (not shown) are disposed between the pivot 116 and each frame member 210l, 210t. In some embodiments, bushings or tapper rollers could be used in place of bearings.

In the present embodiment, the leading and trailing frame members 210l, 210t have apertures defined by loops 214l, 214t (FIG. 5). The pivot 116 extends through the apertures of the loops 214l, 214t similar to a pin in a hinge assembly, and provides for pivotable connection of the leading and trailing frame members 210l, 210t about the pitch pivot axis 118. On the outwards side of the sprocket wheel 550, the damper 300 interconnects an upper portion 220l of the leading frame member 210l and an upper portion 220t of the trailing frame member 210t. The damper 300 controls the pivot motion about the pitch pivot axis 118 of the leading and trailing frame members 210l, 210t one relative to the other. The damper 300 includes a hydro-pneumatic cylinder 302. In some embodiments, the damper 300 further includes a coil spring. In some embodiments, the damper 300 is replaced by a coil spring, an air spring or a hydro-pneumatic spring. When the track system 40 supports the weight of the vehicle 60, damper 300 is deformed (i.e. compressed) and the cylinder 302 provides for a dampened pivotal motion of the leading and trailing frame members 210*l*, 210*t* relative to each other.

The positioning of the damper 300 between the upper portions 220*l*, 220*t* of the leading and trailing frame members 210*l*, 210*t* respectively, allows for a relatively long stroke of the cylinder 302 of the damper 300. As a result, the damping action of the damper 300 is generally more refined than in conventional track systems where the stroke of a damping cylinder is shorter. Such configuration provides for a smoother damping action of the damper 300 and may reduce the risks of fully compressing the damper 300. Under certain conditions, vibrations that are due to the ground surface on which the track system 40 travels and transferred to the leading and trailing frame members 210*l*, 210*t* are dampened by the damper 300. As described above, the stop 160 limits the pivotal motion of the leading frame member 210*l* relative to the plate 130, and the pivotal motion of the trailing frame member 210*t* is limited by the stroke of the cylinder 302.

In some embodiments, the damper 300 has variable damping characteristics as described in commonly owned International Patent Application No. PCT/CA2016/050418, filed Apr. 11, 2016, entitled "Progressive Damping System for a Track System" and published as WO 2016/161527. The content of this application is incorporated herein by reference in its entirety.

Figure 1:
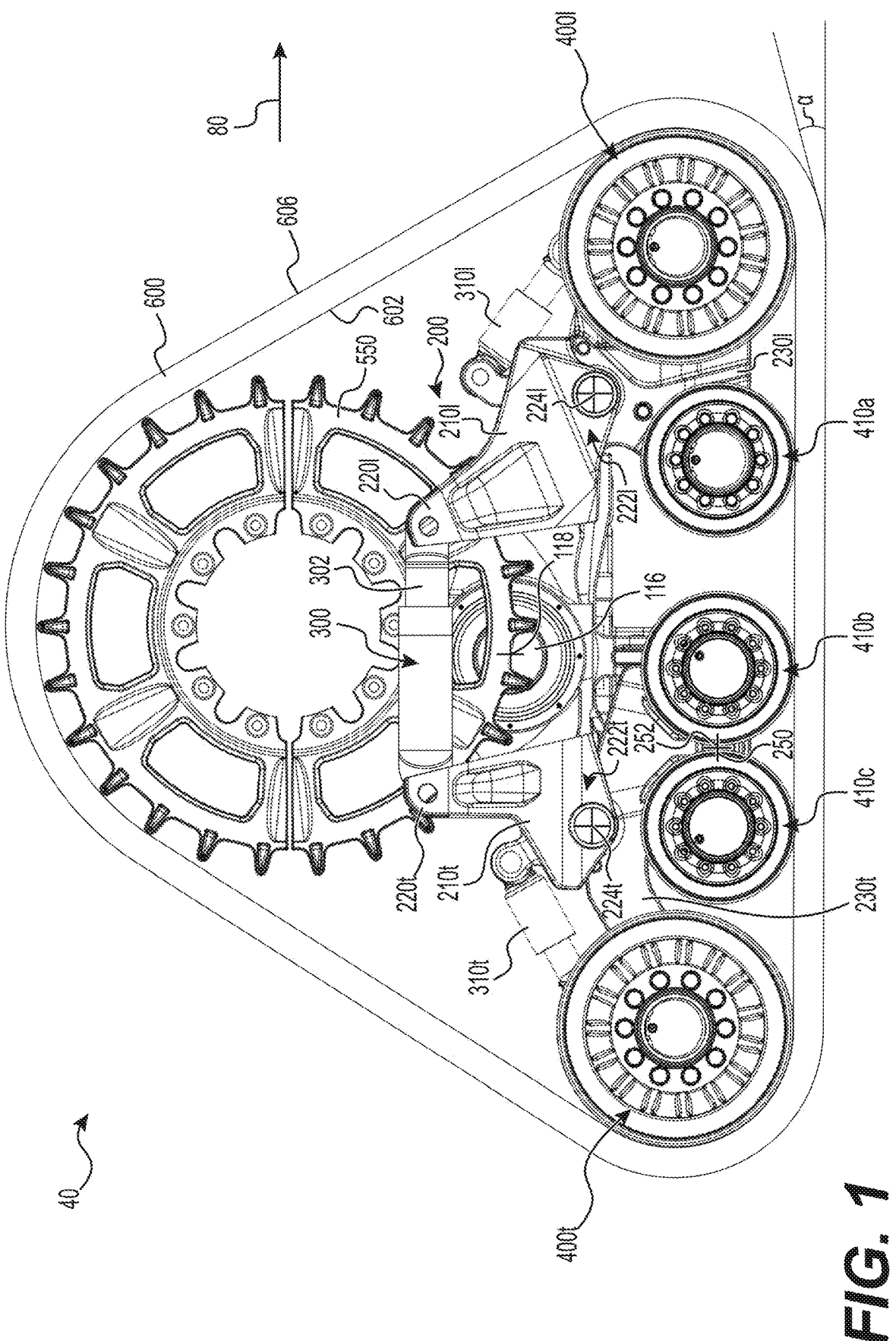
FIG. 1 is a right side elevation view of a track system being an embodiment of the present technology configured to be operatively connected on a right side of a vehicle.
Figure 11:
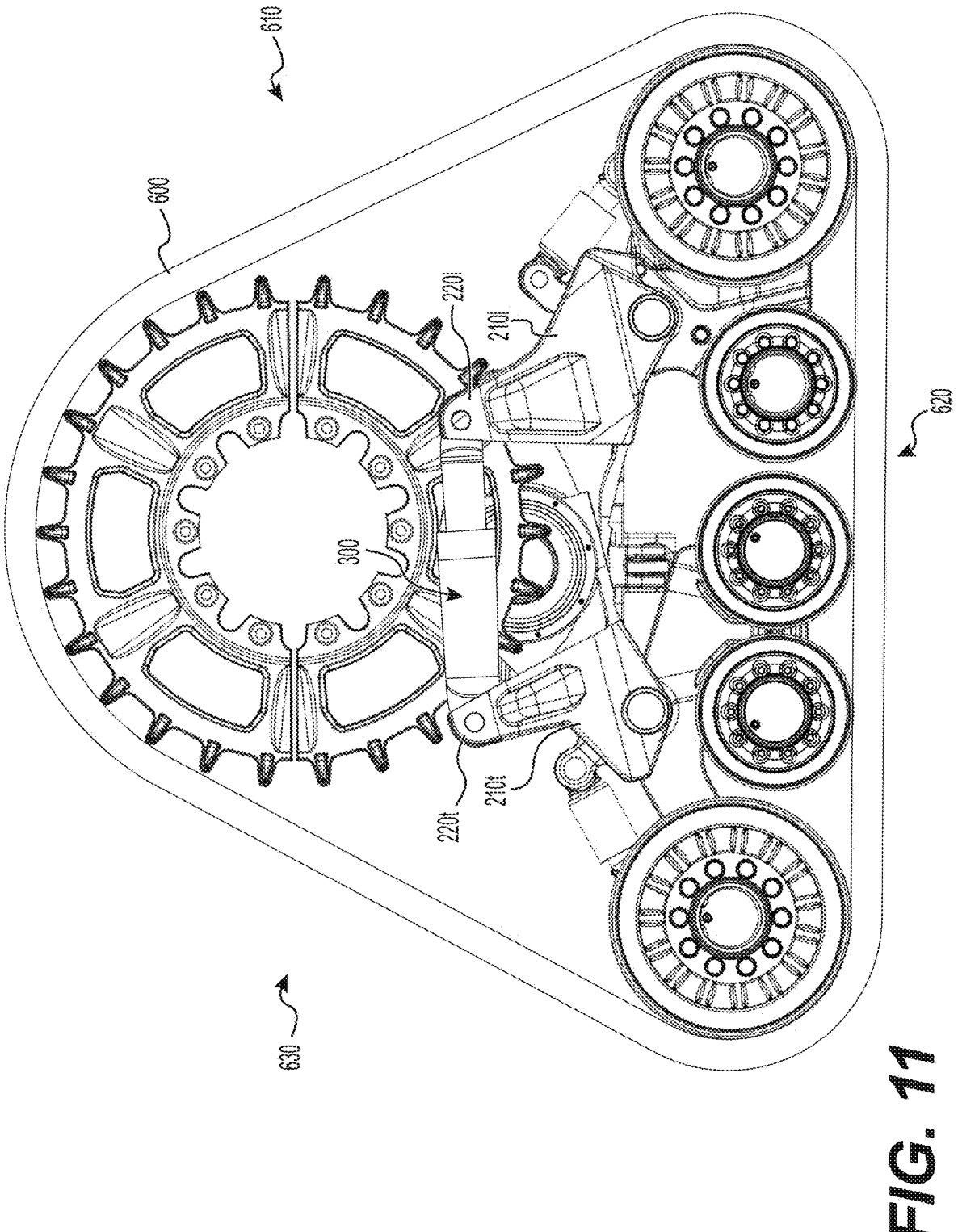
FIG. 11 is a right side elevation view of the track system of FIG. 1, with the damper in the fully extended position.
Figure 12:
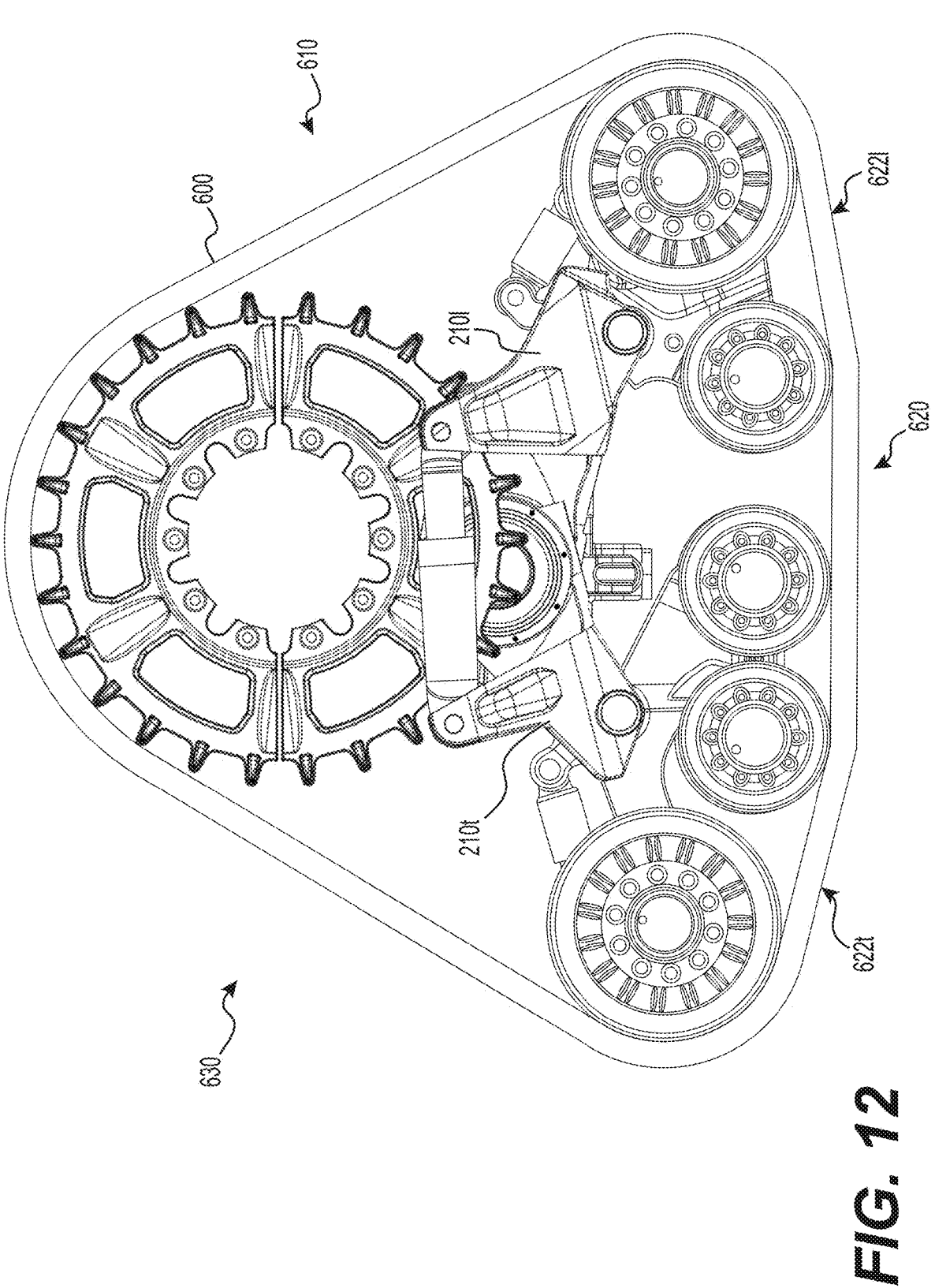
FIG. 12 is a right side elevation view of the track system of FIG. 11, with the leading and trailing idler wheel assemblies raised.
Figure 13:
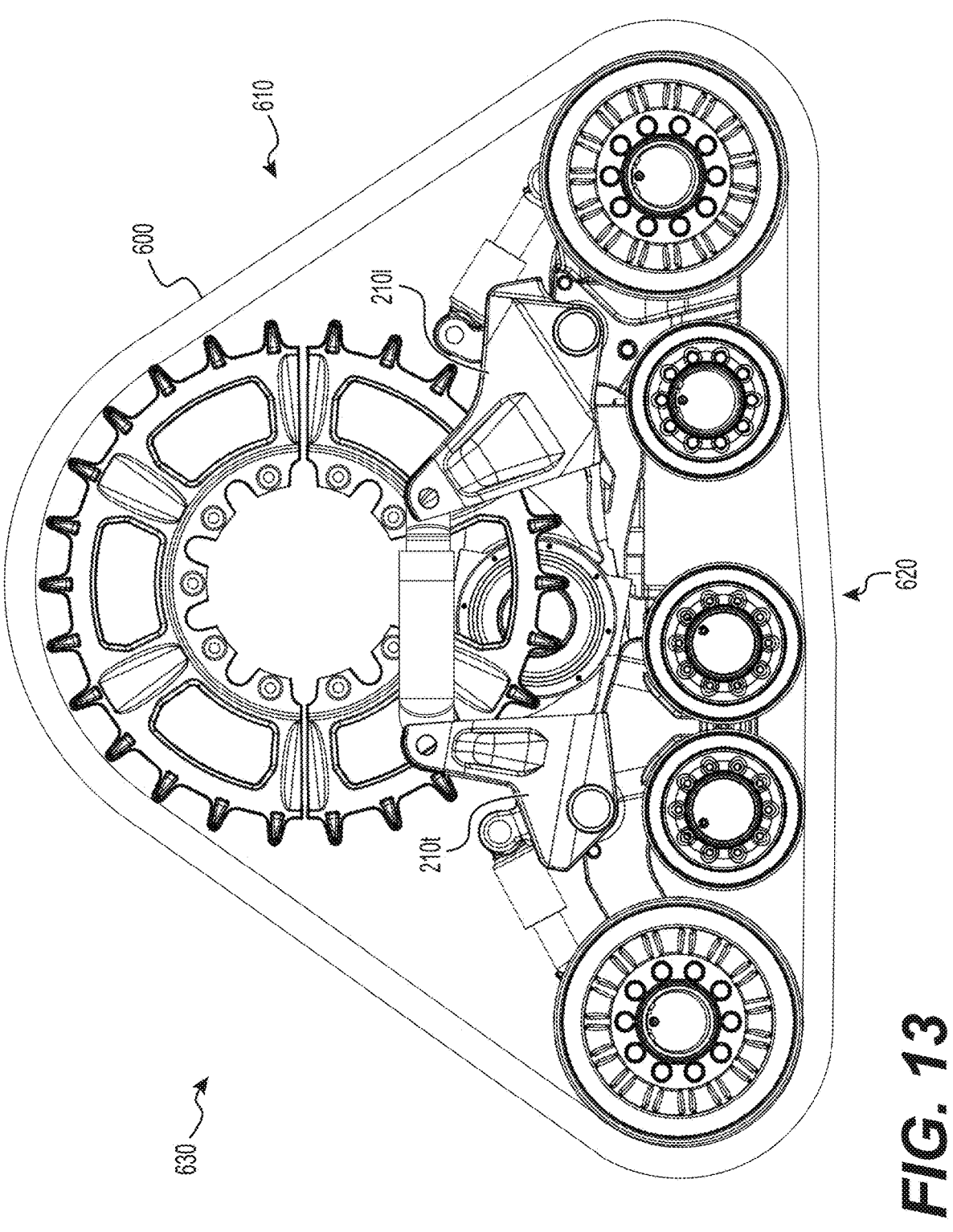
FIG. 13 is a right side elevation view of the track system of FIG. 1, with the damper in the fully compressed position.
Figure 14:
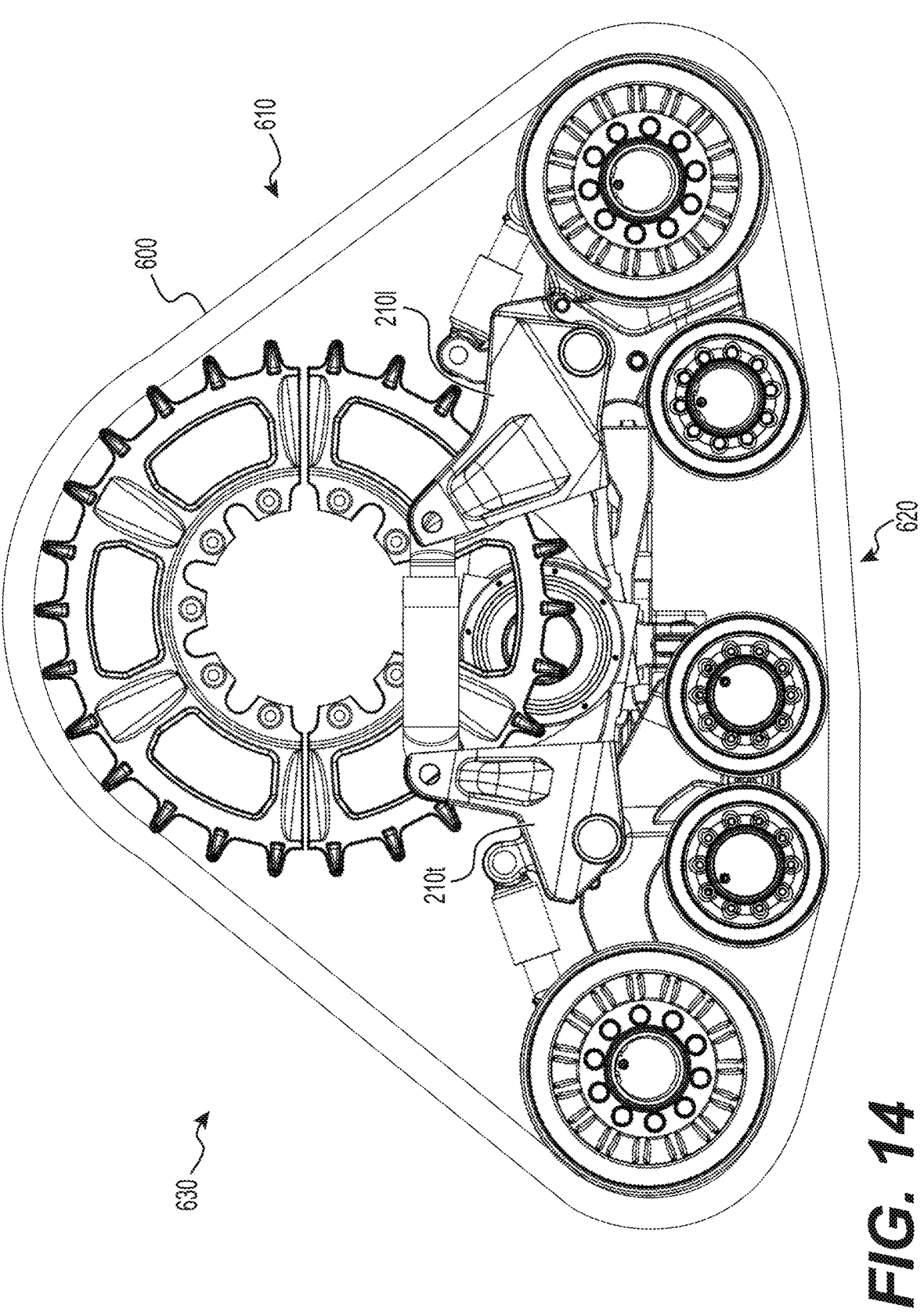
FIG. 14 is a right side elevation view of the track system of FIG. 13, with the leading and trailing idler wheel assemblies raised.

FIGS. 1, 11 and 13 illustrate different configurations of the track system 40 when stationary and with each of the leading and trailing idler and support wheel assemblies 400*l*, 400*t*, 410*a*, 410*b*, 410*c* positioned for the endless track 600 to be in ground contact (i.e. the ground engaging segment 620 extends from below the leading idler wheel assembly 400*l* to below the trailing idler wheel assembly 400*t*). Referring to FIG. 1, the track system 40 is shown in a rest configuration. In this position, the track system 40 supports a nominal load. The nominal load of the track system 40 corresponds to the track system 40 being attached to the vehicle 60 with the track system 40 bearing its ordinary portion of the weight of the vehicle 60 when the vehicle 60 is at its tare weight, with no implements or attachments at the front or rear and no payload in its container or tank. Referring to FIG. 11, the track system 40 is shown with the damper 300 fully extended. Such configuration would be found when the track system 40 supports a load that is smaller than the nominal load. In FIG. 13, the track system 40 is shown with the damper 300 fully compressed. Such configuration would be found when the track system 40 supports a load that is greater than the nominal load.

Still referring to FIGS. 1, 11 and 13, the leading and trailing frame members 210*l*, 210*t* of the track system 40 define a somewhat scissor-like structure, with each frame member 210*l*, 210*t* pivoting about the pivot 116, and the damper 300 interconnected therebetween. Each one of the leading and trailing wheel-bearing members 230*l*, 230*t* is in turn pivotably connected to the leading and trailing frame member 210*l*, 210*t*, respectively. The pivoting of each of these structures, along with the damper 300, may assist in reducing the vertical displacements and vibrations transferred from the track system 40 to the chassis 62 of the vehicle 60 under certain conditions.

In addition, having the track system 40 with such a scissor-like structure has other advantages in certain situations. For example, as the weight of the vehicle 60 increases, for example during harvesting or loading operations, the scissor-like structure can open and a ground-contacting portion of the endless track 600 occurs over an increased surface area (i.e. the ground engaging segment 620 increases in size as the load borne by the track system 40 increases—at least for some increases in load—depending on the design of a specific track system). As a result, in some circumstances, the pressure applied to the ground by the endless track 600 (owing to the weight and load of the vehicle 60) increases at a lower rate than the weight of the vehicle 60. In certain embodiments, this will allow the track system 40 to bear additional loads as compared with conventional track systems.

Leading and Trailing Wheel-Bearing Frame Members and Idler Wheels

Referring to FIG. 7, in the illustrated embodiment of the present technology, the leading wheel-bearing frame member 230*l* is directly pivotably connected to the lower portion 222*l* of the leading frame member 210*l* and pivots about the axis 224*l*. The leading idler wheel assembly 400*l* is rotatably connected to the leading wheel-bearing frame member 230*l* and rotates about an axis 404*l*. A leading idler actuator assembly 310*l* is connected between the leading wheel-bearing frame member 230*l* and the leading frame member 210*l* for adjusting the pivotal positioning of the leading idler wheel assembly 400*l* relative to the leading frame member 210*l*. When the leading idler actuator assembly 310*l* is retracted, as shown in FIG. 7, the leading idler wheel assembly 400*l* pivots about the axis 224*l* (in the counter-clockwise direction in FIG. 7) and is pulled toward the leading frame member 210*l*. When the leading idler actuator assembly 310*l* is retracted, the leading ground engaging segment 622*l* extends above ground (when the track system 40 is disposed on flat level ground) as shown in FIG. 7. In some circumstances, such as when the track system 40 has to travel over a bump or has to get out of a pothole or a ditch, raising the leading idler wheel assembly 400*l* may assist in overcoming the bump or getting the track system 40 out of the pothole or ditch. In addition, raising the leading idler wheel assembly 400*l* using the actuator 310*l* may prevent undesirable soil compaction as the track system 40 gets out of the pothole or the ditch compared to conventional track systems where the leading idler wheel assembly 400*l* would remain lowered. In the present embodiment, the leading idler actuator assembly 310*l* also limits the pivotal motion and provides for a dampened pivotal motion of the leading wheel-bearing frame member 230*l* and the leading frame member 210*l* relative to each other about the axis 224*l*.

Referring to FIG. 8, the trailing wheel-bearing frame member 230*t* is directly pivotably connected to the lower portion 222*t* of the trailing frame member 210*l* and pivots about the axis 224*t*. The trailing idler wheel assembly 400*t* is rotatably connected to the trailing wheel-bearing frame member 230*t* and rotates about an axis 404*t*. A trailing idler actuator assembly 310*t* is connected between the trailing wheel-bearing frame member 230*t* and the trailing frame member 210*t* for adjusting the pivotal positioning of the trailing idler wheel assembly 400*t* relative to the trailing frame member 210*t*. When the trailing idler actuator assembly 310*t* is retracted, as shown in FIG. 8, the trailing idler wheel assembly 400*t* pivots about the axis 224*t* (in the clockwise direction in FIG. 8) and is pulled toward the trailing frame member 210*t*. When the trailing idler actuator assembly 310*t* is retracted, the trailing ground engaging segment 622*t* extends above ground (when the track system 40 is disposed on flat level ground) as shown in FIG. 8. In some circumstances, such as when the track system 40 is travelling backwards over a bump or is getting out of a pothole or a ditch, raising the trailing idler wheel assembly 400t may assist in overcoming the bump or getting the track system 40 out of the pothole or the ditch. In the present embodiment, the trailing idler actuator assembly 310t also limits the pivotal motion and provides for a dampened pivotal motion of the trailing wheel-bearing frame member 230t and the trailing frame member 210t relative to each other.

It is also contemplated that, in some conditions, the idler actuator assemblies 310l, 310t could be deactivated and configured to provide for an unbiased pivotal motion of their respective wheel-bearing frame member relative to their respective frame member.

In other embodiments, the actuator assemblies 310l, 310t could be replaced by electric motors, such as stepper motors, or any other suitable device operatively connected between the leading frame member 210l and the leading wheel-bearing frame member 230l, and the trailing frame member 210t and the trailing wheel-bearing frame member 230t for adjusting the pivotal positioning therebetween.

Figure 9:
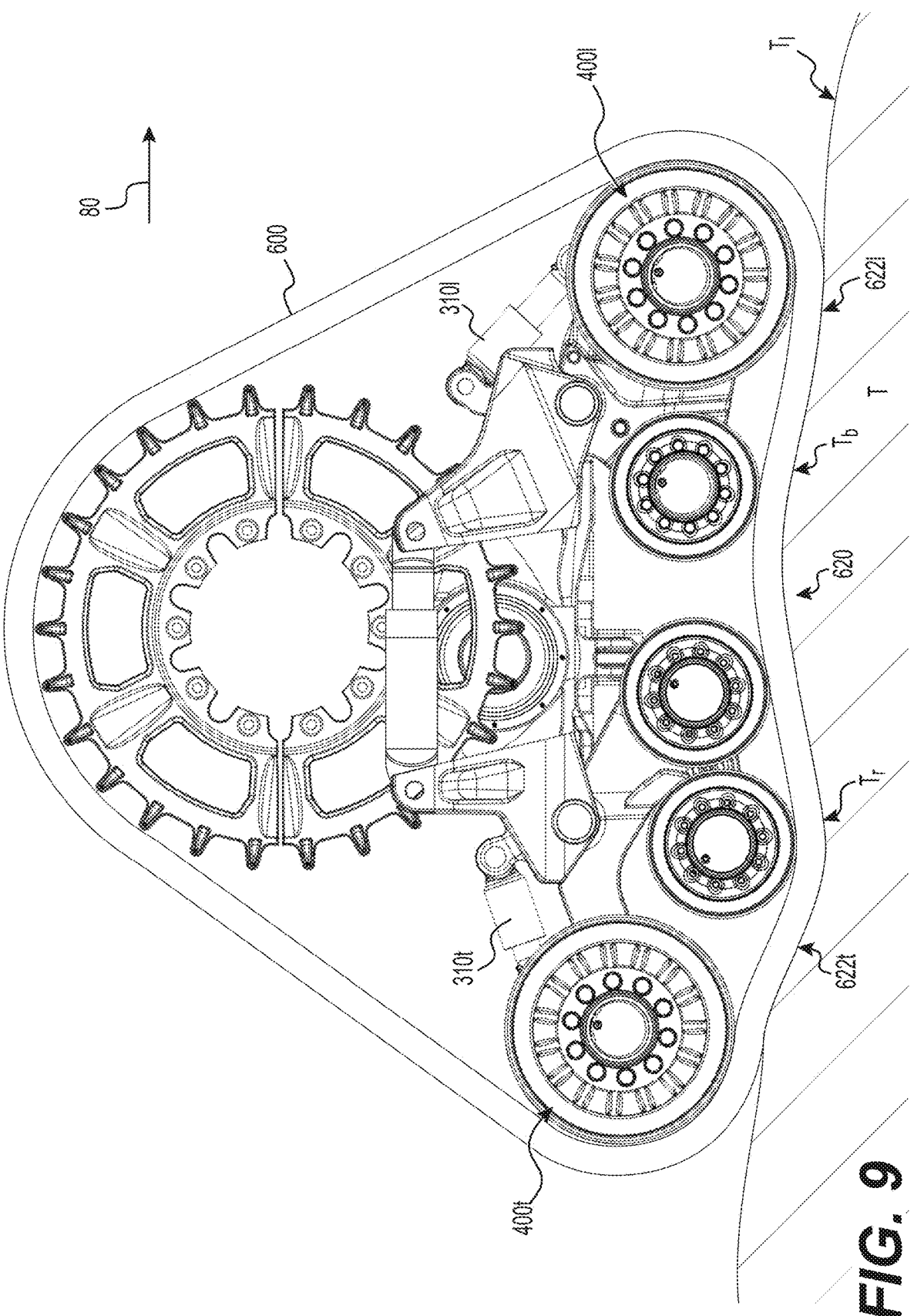
FIG. 9 is a right side elevation view of the track system of FIG. 1 travelling on an uneven terrain, with the trailing idler actuator retracted and the leading idler actuator extended.

Referring to FIGS. 7 to 10A, upon extension or retraction of the actuator assemblies 310l, 310t, the endless track 600 can selectively have the leading ground-engaging segment 622l and/or the trailing ground engaging segment 622t extending on or above the ground surface. Referring to FIG. 9, the track system 40 is shown travelling in the forward travel direction 80 over an uneven terrain T. When the leading idler wheel assembly 400l travels over a downwardly inclined surface Tl and the support wheel assembly 410a travels over a bump Tb, the leading actuator assembly 310l is passively or actively extended to maintain as much of the leading ground engaging segment 622l as possible in contact with the terrain T. As a result, the load born by the track system 40 is distributed over a larger area than if the leading idler wheel assembly 400l were raised upon retraction of the actuator assembly 310l. Similarly, as the trailing support wheel assemblies 410b, 410c and the idler wheel assembly 400t travel in a recess Tr, the trailing idler actuator 310t is passively or actively retracted to maintain as much of the trailing ground engaging segment 622t as possible in contact with the terrain T. As a result, the load born by the track system 40 is distributed over a larger area than if the trailing idler wheel assembly 400t were lowered upon extension of the actuator assembly 310t and pressure is thus more evenly distributed along the ground engaging segment 620 of the endless track 600.

Referring to FIG. 10A, both the leading and trailing actuator assemblies 310l, 310t are retracted and, as mentioned above, the ground engaging segment 620 is shorter than in the configurations shown in FIG. 1, 7 or 8. The configuration of FIG. 10A can assist in reducing wear of the endless track 600 when travelling over hard ground surfaces, such as a paved road. As the amount of endless track 600 in ground contact is reduced compared to the configurations shown in FIGS. 1, 7 and 8, rolling resistance of the track system 40 and/or wear of the endless track 600 are reduced under some conditions. In addition, when the leading ground engaging segment 622l extends above ground, an angle of attack a of the endless track 600 when engaging the ground surface is reduced compared to the same angle of attack a in the configuration shown in FIG. 1 where the endless track 600 wraps around the leading idler wheel assembly 400l and contacts the ground. The angle of attack a of the endless track 600 shown in FIG. 7 may assist in reducing wear of the tread 608 under some conditions.

Moreover, steering of the track system 40 is facilitated when both the leading and trailing actuator assemblies 310l,

310t are retracted, and the track system 40 has a behavior that is more akin to a wheel and tire assembly. Thus, under certain conditions such as when the track system 40 travels over hard ground surfaces, configuring the track system 40 as shown in FIG. 10A is advantageous over the configuration shown in FIG. 1 to reduce wear of the endless track 600.

Tensioner

Figure 10B:
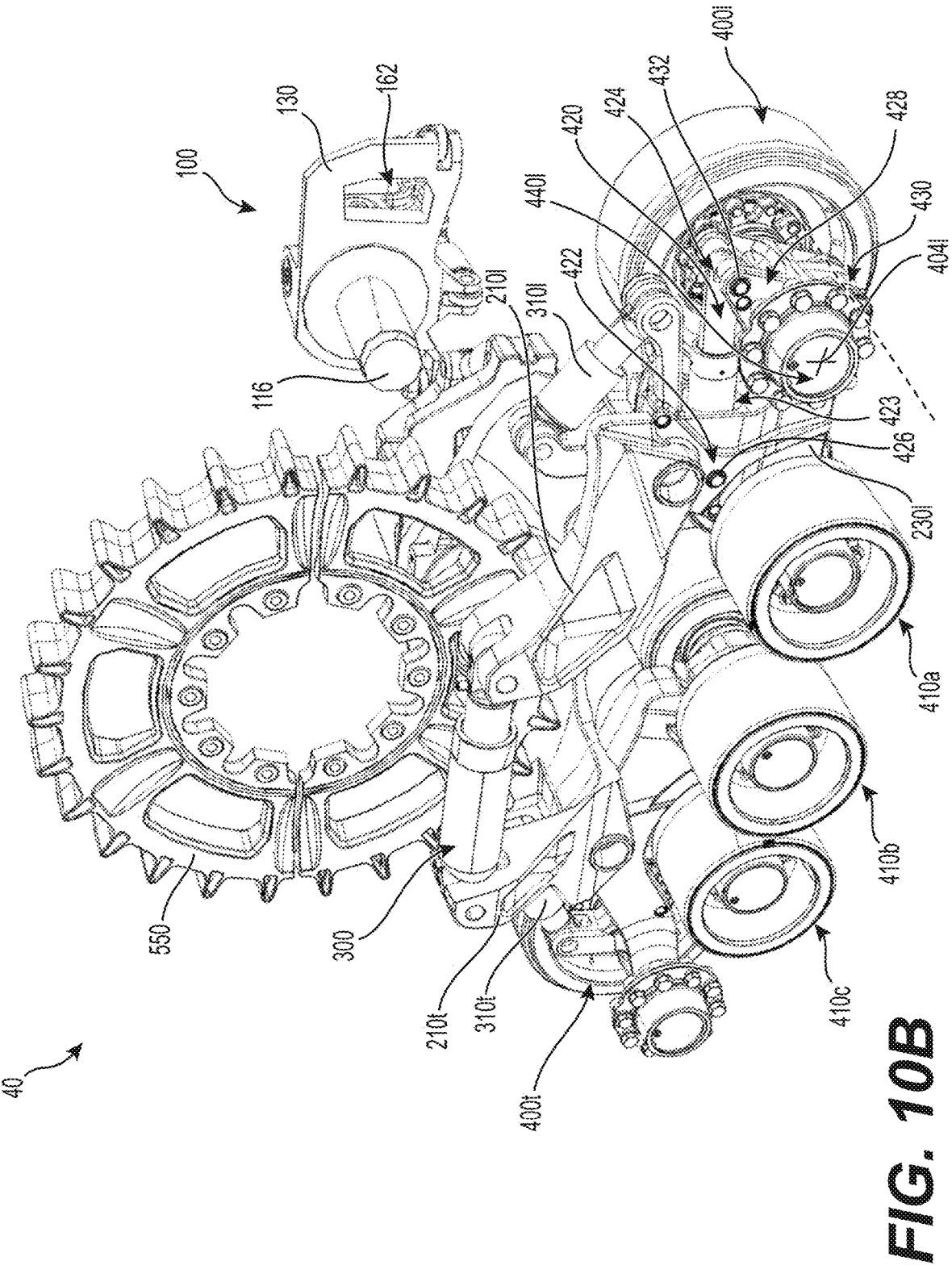
FIG. 10B is a partially exploded, perspective view taken from a front, top right side of the track system of FIG. 1, with the endless track and one idler wheel of the leading and trailing idler wheel assemblies removed.

Referring now to FIG. 10B, the leading wheel-bearing frame member 230l includes a tensioner 420 having first and second ends 422, 424 respectively. The first end 422 extends inside a recess 423 of the leading wheel-bearing frame member 230l and is rotatably connected to the leading wheel-bearing frame member 230l at a proximal tensioning pivot 426. A wheel linkage 428 is rotatably connected to the leading wheel-bearing frame member 230l at an axis 430 (shown as a dashed line in FIG. 10B) that is offset from the axis 404l. The second end 424 of the tensioner 420 is rotatably connected to the wheel linkage 428 at a distal tensioning pivot 432 which is offset from the axis 404l. A leading axle assembly 440l is operatively connected to the wheel linkage 428 and defines the axis 404l. The distal tensioning pivot 432 and the axis 430 are angularly displaced around the axis 404/such that the wheel linkage 428 forms a lever with the axis 430 being the fulcrum thereof.

Figure 15:
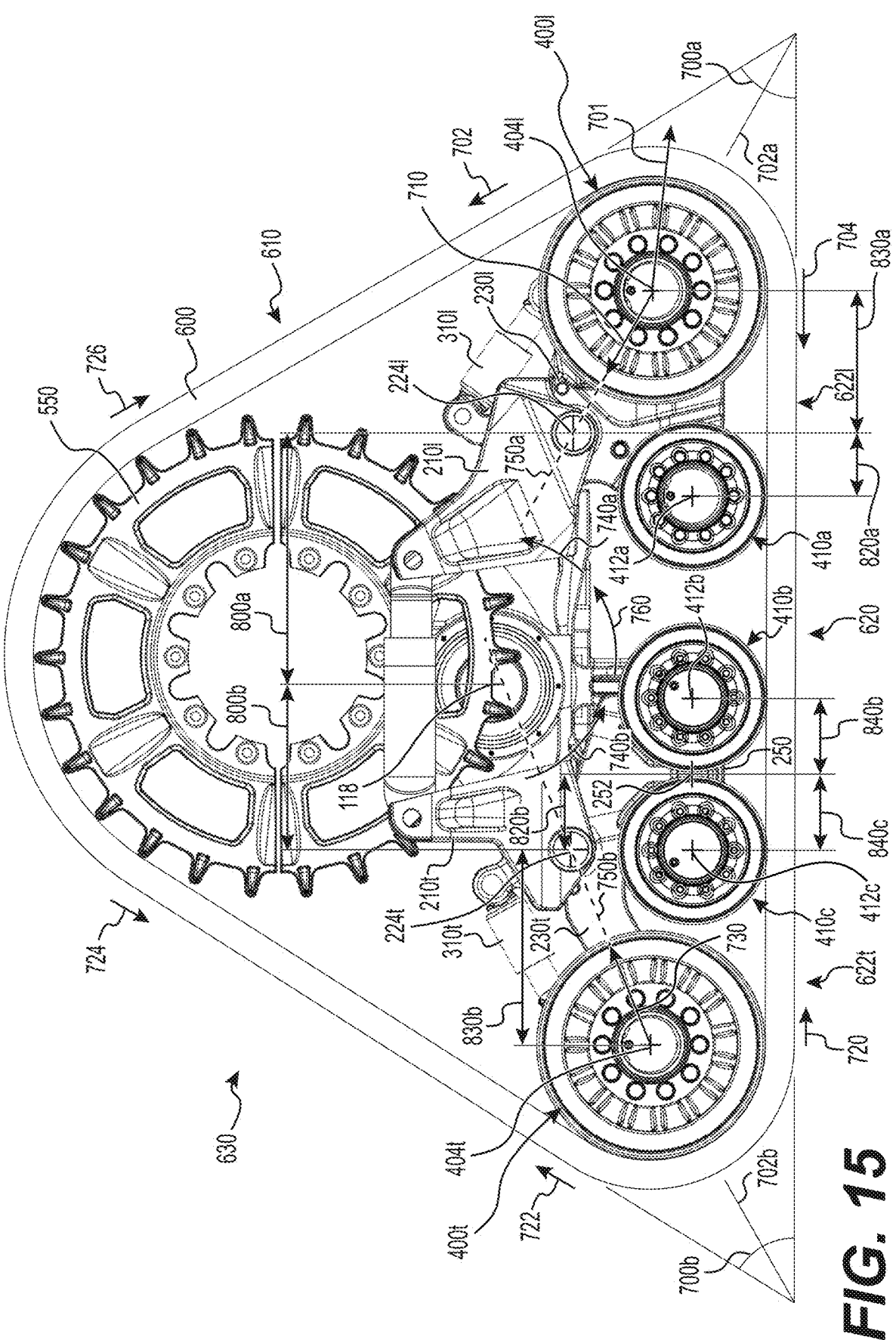
FIG. 15 is a right side elevation view of the track system of FIG. 1 in a rest configuration and stationary.
Figure 16:
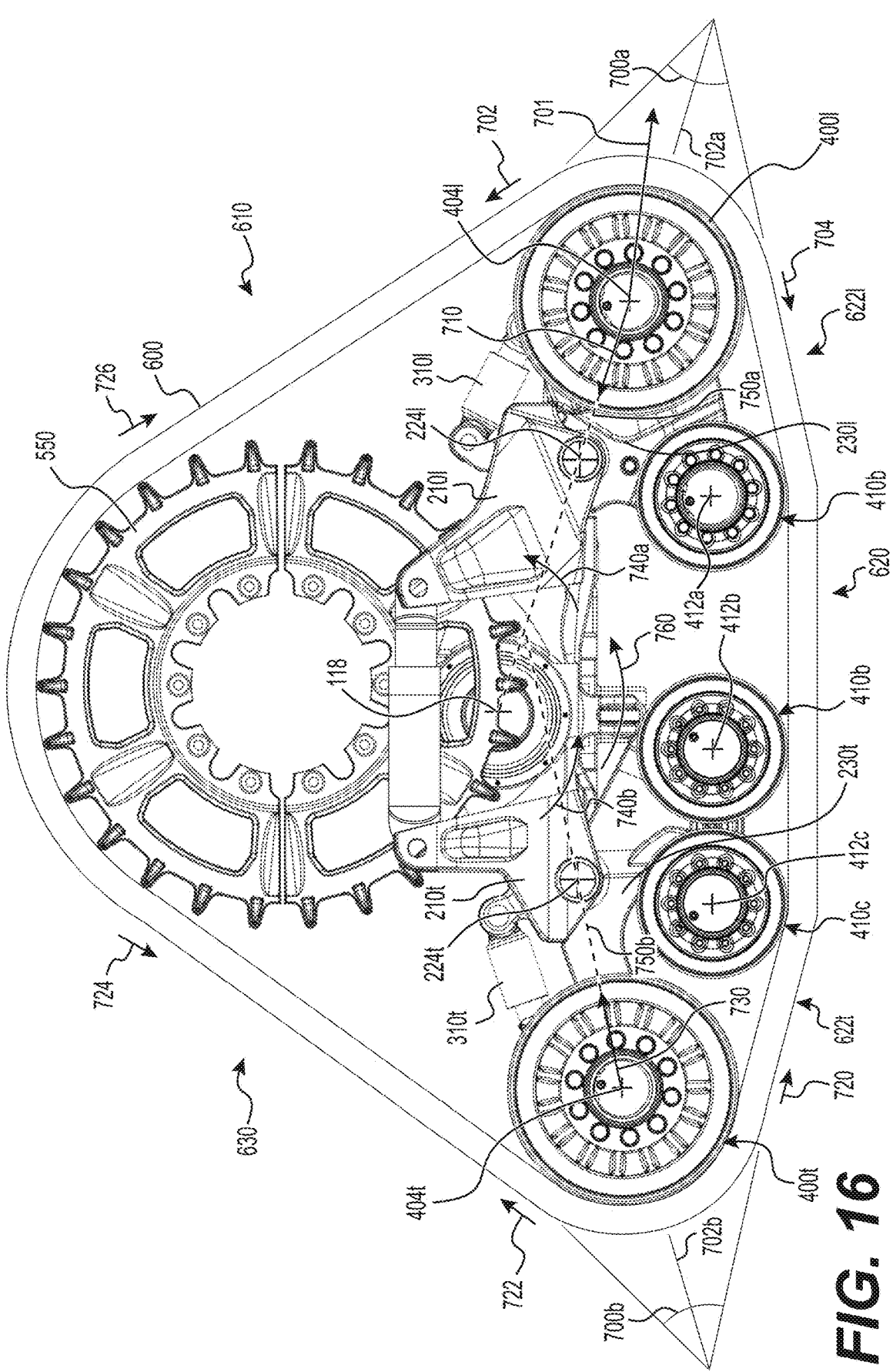
FIG. 16 is a right side elevation view of the track system of FIG. 1, with the leading and trailing idler wheel assemblies raised and stationary.

The action of the tensioner 420 and the wheel linkage 428 bias the leading axle assembly 440l forward, and thus the leading idler wheel assembly 400l is biased toward the forward end of the track system 40 with a biasing force 701 (FIGS. 15 and 16). The endless track 600 opposes the biasing force 701 provided by the action of the tensioner 420 and the wheel linkage 428. Tensions 702, 704 (FIGS. 15 and 16) appear in the leading segment 610 and the leading ground-engaging segment 622l of the endless track 600.

In some embodiments, the tensioner 420 is used to reduce the variations in the perimeter of the endless track 600 due to the pivoting of the leading and trailing frame members 210l, 210t respectively and leading and trailing wheel-bearing frame members 230l, 230t respectively. In some embodiments, the tensioner 420 is also operatively connected to the leading idler actuator assembly 310l and/or the trailing idler actuator assembly 310t. When operatively interconnected, for example using a shared hydraulic system, the leading and trailing idler actuator assemblies 310l, 310t and the tensioner 420 are operated in collaborative, synergistic fashion so as to reduce the variations in the perimeter of the endless track 600 and to prevent damage to the endless track 600 and/or any one of the actuator assemblies 310l, 310t and the tensioner 420. In addition and referring to FIG. 9, the tensioner 420 and the leading and trailing idler actuator assemblies 310l, 310t can be operated in collaborative, synergistic fashion so as to maintain as much of the ground engaging segment 620 as possible in contact with the terrain T while maintaining adequate tension in the endless track 600. This is particularly useful when the terrain T and the bump Tb is sensitive to soil compaction issues. Should the terrain T be a hard ground surface not sensitive to soil compaction issues, the leading and trailing idler actuator assemblies 310l, 310t and the tensioner 420 could be operated in collaborative, synergistic fashion so as to increase the tension in the endless track to maximum operational tension so that the endless track 600 extends rigidly above the recess Tr (i.e. without conforming to it) and over the bump Tb.

In addition, under certain conditions, if debris becomes stuck between one of the wheel assemblies and the endless track 600, the tensioner 420 is configured to apply less biasing force 701 and/or retract so as to reduce variation in the perimeter of the endless track 600. When debris are ejected from the track system 40, the tensioner 420 is configured to apply more biasing force 701 and/or extend to provide for adequate tension forces 702, 704 in the endless track 600. In addition, the tensioner 420 can be operated so as to increase tension in the endless track 600 in some circumstances, such as during a hard braking event. An increased tension in the endless track 600 may reduce the risks of lugs 604 of the endless track 600 skipping on the sprocket wheel 550.

In some embodiments, the tensioner 420 is a dynamic tensioning device as described in commonly owned International Patent Application No. PCT/CA2016/050419, filed Apr. 11, 2016, entitled "*Dynamic Tensioner Locking Device for a Track System and Method Thereof*", and published as WO 2016/161528. The content of this application is incorporated herein by reference in its entirety.

Support Wheel Assemblies

Figure 18:
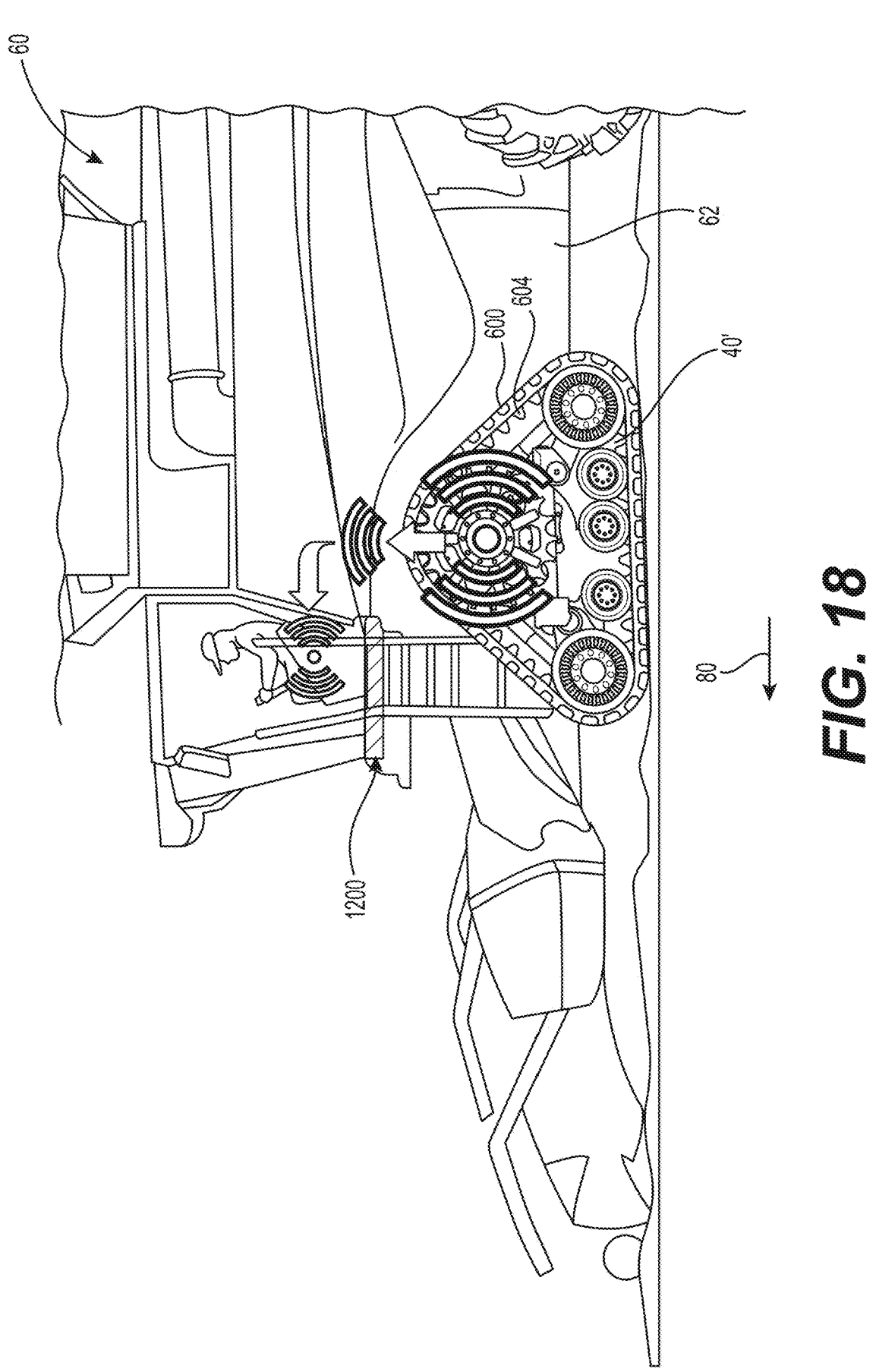
FIG. 18 is a left side elevation view of the vehicle of FIG. 2 with the track system being a mirror image of the track system of FIG. 1 operatively connected to the left side thereof.

Referring to FIGS. 15 and 16, the support wheel assembly 410a is rotatably connected to the leading wheel-bearing frame member 230l and rotates about an axis 412a. The support wheel assemblies 410b, 410c are rotatably connected to the trailing support wheel assembly 250 and rotate about axes 412b, 412c respectively. The trailing support wheel assembly 250 has a body that is longitudinally elongated and that extends above the lugs 604 of the endless track 600 (the lugs 604 are shown in FIG. 18). The trailing support wheel assembly 250 pivots about the axis 252 with respect to the trailing wheel-bearing frame member 230t. As such, the support wheel assemblies 410b, 410c are indirectly pivotably connected to the trailing wheel-bearing frame member 230t.

Material and Manufacturing

The various components of the track system 40 are made of conventional materials (e.g. metals and metal alloys in most cases, such as steel) via conventional manufacturing processes (e.g. casting, molding, etc.). The present technology merely requires that each component be suitable for the purpose for which it is intended and the use to which it is to be put. Any material(s) or method(s) of manufacture which produce such components may be used in the present technology.

Lines and Resultant Forces

FIGS. 15 and 16 illustrate the track system 40 in a plane view that is parallel to the plane 190 (FIGS. 5 and 6). The pivot axis 118 and the axes 224l, 224t, 252, 404l, 404t, 412a, 412b, 412c are perpendicular to the plane 190 and are represented by "+" signs. The pivot axis 118 and the axis 224l are spaced apart by a longitudinal distance 800a defined in the plane 190. The pivot axis 118 and the axis 224t are spaced apart by a longitudinal distance 800b defined in the plane 190. In this embodiment, the longitudinal distance 800a is greater than the longitudinal distance 800b. As a result, the leading frame member 210l defines a lever arm between the pivot axis 118 and the axis 224l that is greater than the lever arm defined by the trailing frame member 210t between the pivot axis 118 and the axis 224t. As a portion of the weight of the vehicle 60 is transferred from the chassis 62 to track system 40 via the attachment assembly 100 and to the pivot 116, and in turn to the leading and trailing frame members 210l, 210t, the trailing frame member 210t supports a greater load than the leading frame member 210l since the lever arm defined by the trailing frame member 210t between the pivot axis 118 and the axis 224t is shorter. To support the additional load on the trailing frame member 210t and in order to more evenly distribute the weight of the vehicle 60 over the endless track 600, the trailing wheel-bearing frame member 230l has more support wheel assemblies indirectly rotatably connected thereto than the leading wheel-bearing frame member 230l (namely the support wheel assemblies 410b, 410c rotatably connected to the trailing support wheel assembly 250).

The axes 412a, 224l are spaced apart in a longitudinal direction by a longitudinal distance 820a defined in the plane 190. The axes 224l, 404l are spaced apart in a longitudinal direction by a longitudinal distance 830a defined in the plane 190. In this embodiment, the distance 820a is shorter than the distance 830a. A portion of the weight of the vehicle 60 is transferred at the axis 224l from the leading frame member 210l to the leading wheel-bearing member 230l. Since the lever arm defined by the portion of the leading wheel-bearing member 230l supporting the leading support wheel assembly 410a is shorter than the portion of leading wheel-bearing member 230l supporting the leading idler wheel assembly 400l, the leading support wheel assembly 410a supports more load than the leading idler wheel assembly 400l.

The axes 224t, 252 are spaced apart in a longitudinal direction by a longitudinal distance 820b defined in the plane 190. The axes 224t, 404t are spaced apart in a longitudinal direction by a longitudinal distance 830b defined in the plane 190. In this embodiment, the distance 820b is shorter than the distance 830b. A portion of the weight of the vehicle 60 is transferred at the axis 224t from the trailing frame member 210t to the trailing wheel-bearing member 230t. Since the lever arm defined by the portion of the trailing wheel-bearing member 230t supporting the trailing support wheel assembly 250 is shorter than the portion of the trailing wheel-bearing member 230t supporting the trailing idler wheel assembly 400t, the trailing support wheel assembly 250 and the support wheel assemblies 410b, 410c support more load than the trailing idler wheel assembly 400t.

The axes 252, 412b are spaced apart in a longitudinal direction by a longitudinal distance 840b defined in the plane 190. Similarly, the axes 252, 412c are spaced apart in a longitudinal direction by a longitudinal distance 840c defined in the plane 190. In this embodiment, the distances 840b, 840c are equal. As such, the trailing support wheel assemblies 410b, 410c support equal loads.

By using the teachings in the present description and by selecting the dimensions of the various components described herein, a designer of track systems is able to set a distribution of load applied to the endless track 600 by the leading and trailing idler wheel assemblies 400l, 400t and the support wheel assemblies 410a, 410b, 410c to meet the requirements of a particular application, the track system 40 being in any one of the configurations shown in the accompanying Figures.

In the present embodiment, the distances 800a, 800b, 820a, 820b, 830a, 830b, 840b, 840c, the diameter and width of the idler and support wheel assemblies 400t, 410a, 410b, 410c are selected to distribute equally or close to equally the pressure applied to the endless track 600 by the leading support wheel assembly 410a, the trailing support wheel assemblies 410b, 410c and the trailing idler wheel assembly 400t.

In this embodiment, the pressure applied to the endless track 600 by the leading idler wheel assembly 400l is less than the pressure applied by each one of the leading support wheel assembly 410a, the trailing support wheel assemblies 410b, 410c and the trailing idler wheel assembly 400t, at least when the leading idler actuator assembly 310l is not actively extended.

Other configurations in other embodiments are contemplated. For instance, the distances 800*a*, 800*b*, 820*a*, 820*b*, 830*a*, 830*b*, 840*b*, 840*c*, the diameter, width, cross-sectional profile and structure of the idler and support wheel assemblies 400*l*, 400*t*, 410*a*, 410*b*, 410*c* could be selected to equalize the pressure applied to the endless track 600 by the support wheel assemblies 410*a*, 410*b*, 410*c*. In yet other embodiments, the distances 800*a*, 800*b*, 820*a*, 820*b*, 830*a*, 830*b*, 840*b*, 840*c*, the diameter and width of the idler and support wheel assemblies 400*l*, 400*t*, 410*a*, 410*b*, 410*c* could be selected to equalize the pressure applied to the endless track 600 by the leading and trailing idler wheel assemblies 400*l*, 400*t*.

Note that in the accompanying Figures, the arrows indicating the tension forces, torques and biasing force are not to scale, they are schematic. Referring to FIGS. 15 and 16 and as described above, the combined actions of the tensioner 420 and the wheel linkage 428 (shown in FIG. 10B) on the leading idler wheel assembly 400*l* generate a biasing force 701 at the axis 404*l*. As a result, opposed tension forces 702, 704 exist in the leading and ground engaging segments 610, 620 of the endless track 600. A resultant force 710 (e.g. the combination of tension forces 702, 704) is applied to the leading idler wheel assembly 400*l* at the axis 404 and opposes biasing force 701. The leading and ground engaging segments 600, 620 of the endless track 600 form an angle 700*a*. The resultant force 710 is colinear with a bisector 702*a* of the angle 700*a*.

The leading wheel-bearing frame member 230*l* carries the resultant force 710 to the axis 224*l* along a line 750*a* extending between the axis 404*l* and the axis 224*l*, the line 750*a* being shown as a dashed line in FIGS. 15 and 16. In FIG. 15, the line 750*a* is colinear with the bisector 702*a*, but it could be otherwise in other embodiments as other configurations of the leading wheel bearing frame member 230*l* are contemplated. Having the resultant force 710 passing through the axis 224*l* has the effect of preventing the generation of a torque that is applied to the leading wheel-bearing member 230*l* about the axis 224*l*. The line 750*a* and the bisector 702*a* extend above the pivot axis 118. As the resultant force 710 is applied along the bisector 702*a*, the resultant force 710 passes above the pivot axis 118. Having the resultant force 710 passing above the pivot axis 118 has the effect of generating a torque 740*a* that is applied to the leading frame member 210*l* about the pitch pivot axis 118, inducing a rotation in a counter-clockwise direction referring to FIG. 15. The torque 740*a* also has the effect of decreasing the load supported by the leading idler wheel assembly 400*l*, and increasing the load supported by the support wheel assemblies 410*b*, 410*c* and the trailing idler wheel assembly 400*t*. The load applied to the leading idler wheel assembly 400*l* can be increased by actively extending the leading idler actuator assembly 310*l*. As such, the load applied to the endless track 600 by the leading idler wheel assembly 400*l* and the leading support wheel assembly 410*a* depends at least in part on the biasing force 701 applied by the tensioner assembly 420 and the actuation force exerted by the leading actuator assembly 310.

To oppose the tension forces 704, equally opposed tension forces 720 are applied on the ground-engaging segment 620 of the endless track 600 proximate to the trailing idler wheel assembly 400*t*. Tension forces 722 also appear in the trailing segment 630 of the endless track 600 and oppose tension forces 724, 726 appearing in the endless track 600 adjacent to the sprocket wheel 550. In FIGS. 15 and 16, tension forces 702, 704, 720, 722, 724, 726 are equal in magnitude (when the track system 40 is static and without friction). A resultant force 730 (e.g. the combination of tension forces 720, 722) is applied to the trailing idler wheel assembly 400*t* and the resultant force 730 is applied at the axis 4041.

The trailing and ground engaging segments 630, 620 of the endless track 600 form an angle 700*b*. The resultant force 730 is colinear with a bisector 702*b* of the angle 700*b* in FIG. 15. The trailing wheel-bearing frame member 230*t* carries the resultant force 730 to the axis 224*t* along a line 750*b* extending between the axis 404*t* and the axis 224*t*, shown as a dashed line in FIGS. 15 and 16. In FIG. 15, the line 750*b* is colinear with the bisector 702*b*, but it could be otherwise in other embodiments as other configurations of the trailing wheel bearing frame member 230*t* are contemplated. Having the resultant force 730 passing through the axis 224*t* has the effect of preventing the generation of a torque that is applied to the trailing wheel-bearing member 230*t* about the axis 224*t*. The line 750*b* and the bisector 702*b* pass below the pitch pivot axis 118. As the resultant force 730 is applied along the bisector 702*b* in FIG. 15, the resultant force 730 passes below the pivot axis 118, and a torque 740*b* is applied to the trailing frame member 210*t* about the pivot axis 118. From the perspective of FIG. 15, the torque 740*b* has the effect of inducing a counter-clockwise rotation of the trailing frame member 210*t* about the pitch pivot axis 118. The torque 740*b* also has the effect of increasing the load supported by the support wheel assemblies 410*b*, 410*c* and the load supported by the trailing idler wheel assembly 400*t*. The torque 740*b* also has the effect of decreasing the load supported by the leading idler wheel assembly 400*l* and the leading support wheel assembly 410*a*.

In the present embodiment, the magnitude of the force 730 is equal to the resultant force 710, but the magnitude of the torque 740*b* is greater than that of the torque 740*a*. A net torque 760 is applied to the track system 40 in the same direction as torques 740*a*, 740*b*, in the counter-clockwise direction when referring to FIGS. 15 and 16. The damper 300 limits the pivotal motion of the leading and trailing frame members 210*l*, 210*t* about the pivot axis 118 and the net torque 760 has the effect of decreasing the load supported by the leading idler wheel assembly 400*l* and the support wheel assembly 410*a*.

When the track system 40 is driven, additional tension forces appear in the endless track 600 because of the tractive forces applied by the sprocket wheel 550 to the endless track 600. As such, the magnitude of tension forces 724, 722 and 720 increases. Simultaneously, the tensioner 420 is configured to increase its biasing force 701 and maintain adequate tension forces 702, 704 in the endless track 600. These additional tension forces make the magnitude of the resultant force 730 greater when the track system 40 is driven, and the magnitude of the resultant force 730 becomes greater than the magnitude of the resultant force 710.

When the track system 40 is driven, the load applied to the endless track 600 (and hence pressure applied to the ground surface) under the leading idler wheel assembly 400*l* and leading support wheel assembly 410*a* are decreased, and the pressures applied to the endless track 600 under the support wheel assemblies 410*b*, 410*c* and trailing idler wheel assembly 400*t* are increased. As a result, in some conditions, the track system 40 has a reduced tendency to pitch negatively, especially when driven on soft grounds. This tendency can be modulated by actively extending the leading idler actuator assembly 310*l*, if needed.

Moreover, under certain conditions, heat generation and wear of the outer surface 606 (FIG. 1) of the endless track 600 are reduced when comparing the track system 40 to conventional track systems attached to the same vehicle 60 for the following reasons. First, as there is a reduced load applied under the leading idler wheel assembly 400*l*, there is a reduced pressure applied to the endless track 600 as it engages the ground. The tread 608 has improved engagement with the ground before being parallel thereto and being subjected to tractive forces. Second, as the weight of the vehicle 60 increases, the surface area of the endless track 600 in contact with the ground increases due to the scissor-like structure of the track system 40. Thus, as mentioned above, the pressure on the ground increases at a rate that is less than the rate of increase in weight of the vehicle 60.

Referring to FIG. 16 where the leading and trailing idler actuators 310*l*, 310*t* are retracted, the same lines, forces and torques as described in reference to FIG. 15 are reproduced. The leading idler actuator assembly 310*l* limits the pivotal motion between the leading wheel bearing frame member 230 and the leading frame member 210*l*. The leading wheel-bearing frame member 230*l* carries the force 710 along the line 750*a*, which is not colinear with the bisector 702*a*. As the line 750*a* passes through the axis 224*l* and the pitch pivot axis 118, the force 710 has the effect of inducing no torque 740*a* to the leading frame member 210*l* about the pivot axis 118.

The trailing idler actuator assembly 310*t* limits the pivotal motion between the trailing wheel bearing frame member 230*t* and the trailing frame member 210*t*. The trailing wheel-bearing frame member 230*t* carries the force 730 along the line 750*b*, which is not colinear with the bisector 702*b*. The line 750*b* passes through the axis 224*t* and below the pitch pivot axis 118, and is further below the pitch pivot axis 118 than the line 750*b* found in the configuration of FIG. 15. From the perspective of FIG. 16, the torque 740*b* has the effect of inducing a counter-clockwise rotation of the trailing frame member 210*t* about the pitch pivot axis 118. The magnitude of the torque 740*b* in the configuration of FIG. 16 is greater than in the configuration of FIG. 15. The torque 740*b* also has the effect of increasing the load supported by the support wheel assemblies 410*b*, 410*c* and the load supported by the trailing idler wheel assembly 400*t* while decreasing the load supported by the support wheel assembly 410*a* and the leading idler wheel assembly 400*l*.

Thus, referring to the configuration shown FIG. 16, the net torque 760 has the effect of reducing the tendency of the track system 40 to pitch negatively, and combined with having the leading ground engaging segment 622*l* extending above the ground engaging segment 620, the track system 40 has a configuration that makes it more capable of driving itself out of a ditch, a pothole or to overcome an obstacle, especially when travelling on a soft ground surface.

In summary, the leading and trailing idler actuators 310*l*, 310*t* can be selectively actuated depending on the ground conditions, whether it is to drive the track system 40 out of a ditch, a pothole or to overcome an obstacle, or to distribute more evenly the load on the endless track 600 when travelling on ground which is sensitive to soil compaction issues.

In addition to the reduced tendency of the track system 40 to pitch negatively, when the track system 40 encounters an obstacle such as a bump or a depression along its path of travel, the pivoting of the leading and trailing wheel-bearing members 230*l*, 230*t*, and of the leading and trailing frame members 210*l*, 210*t* has the effect of reducing vertical displacements and vertical acceleration of the pivot 116. Accordingly, vertical displacements and vertical accelerations of the chassis 62 of the vehicle 60 are reduced. Notably, at certain speed regimes, the pivoting of the leading and trailing wheel-bearing members 230*l*, 230*t* alone is sufficient to reduce the vertical displacements of the pivot 116. At other speed regimes, it is the combined action of the pivoting of the leading and trailing wheel-bearing members 230*l*, 230*t* and of the leading and trailing frame members 210*l*, 210*t*, and the damping action of the damper 300 that reduce the vertical displacements and vertical accelerations of the pivot 116.

Track System Controller and Monitoring Sensors

Figure 17A:
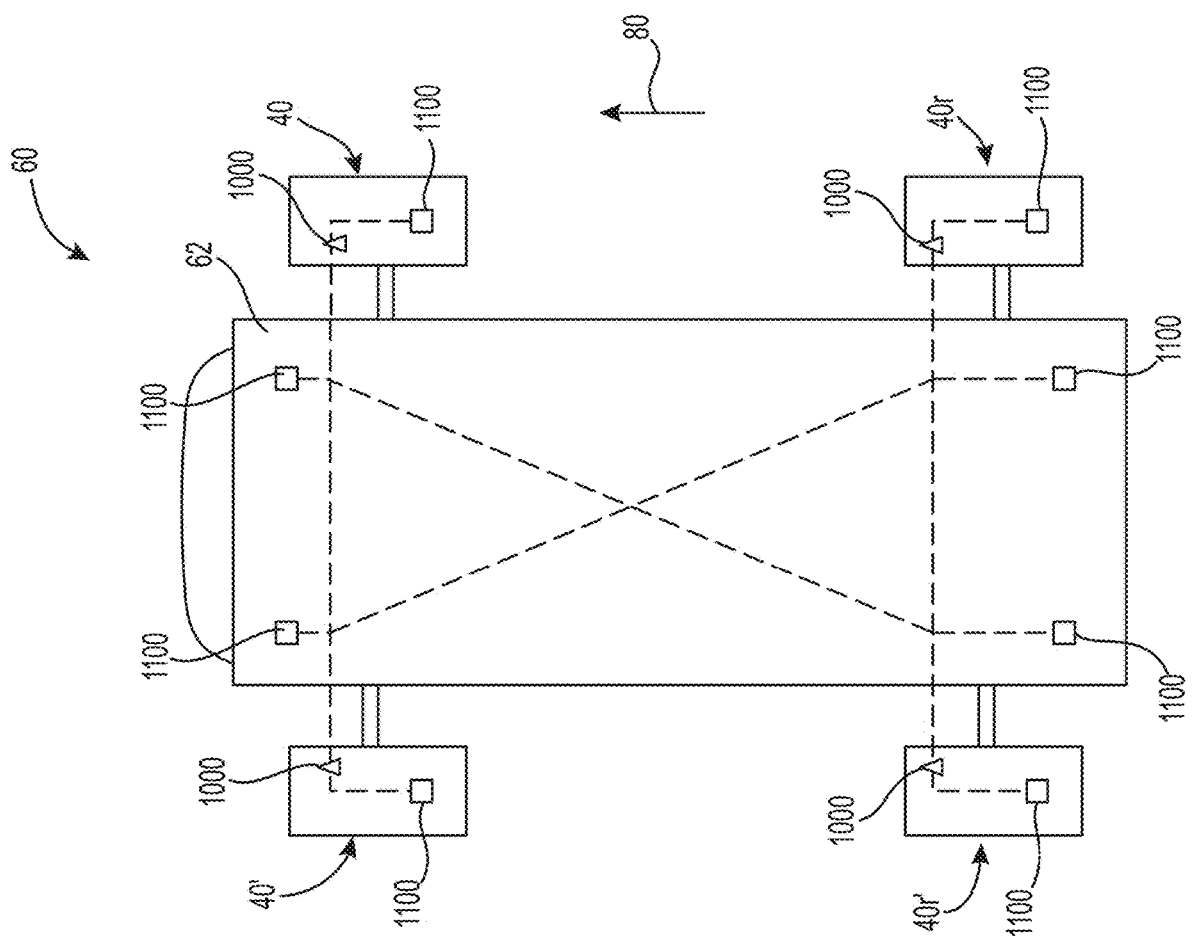
FIG. 17A is a top plan, schematic view of the vehicle of FIG. 2 with track systems operatively connected thereto at each of the four corners.
Figure 17B:
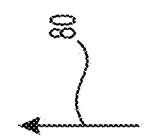
FIG. 17B is a top plan, schematic view of the vehicle of FIG. 17A further including a master control unit and a communication device.

Referring to FIGS. 17A to 17C, the vehicle 60 is schematically represented with a track system 40, according to one embodiment of the present technology, operatively connected at each corner of the vehicle 60. The forward travel direction 80 of the vehicle 60 is also indicated. The track system 40 is operatively connected to the vehicle 60 at the front right corner, the track system 40' is operatively connected to the vehicle 60 at the front left corner, a track system 40*r* is operatively connected to the vehicle 60 at the rear right corner, and a track system 40*r'* is operatively connected to the vehicle 60 at the rear left corner. A track system controller 1000, schematically represented by a triangle in FIGS. 17A to 17C, is operatively connected to each track system 40, 40', 40*r*, 40*r'* and controls the operation of the actuator assemblies 140, 150*l*, 150*t*, 310*l*, 310*t*, 420 for each track system 40, 40', 40*r* and 40*r'*. Each track system controller 1000 is powered by the electrical system of the vehicle 60, and each of the actuator assemblies 140, 150, 150*t*, 310*l*, 310*t*, 420 for each track system 40, 40', 40*r* and 40*r'* is operatively connected to a power source. Each track system controller 1000 includes a memory and a processing unit capable of receiving and sending signals. The dashed lines in FIG. 17A indicate that the track system controllers 1000 are operatively interconnected to one another.

As will be described below, each track system controller 1000 controls the operation of the actuator assemblies 140, 150*l*, 150*t*, 310*l*, 310*t*, 420 of its corresponding track system 40, 40', 40*r*, 40*r'* depending on various input signals received from the operator of the vehicle 60 and/or from a plurality of monitoring sensors 1100, schematically represented in FIGS. 17A to 17C as squares. As such, each track system controller 1000 is programmable and capable of running predetermined sequences and actions so as to control the operation of the actuator assemblies 140, 150*l*, 150*t*, 310*l*, 310*t*, 420 its corresponding track system 40, 40', 40*r*, 40*r'* automatically or using manual override in accordance with a predetermined objective.

In the present embodiment, the monitoring sensors 1100 are mounted at various locations on the vehicle 60 and on each one of the track systems 40, 40', 40*r*, 40*r'*. As will be described below, the monitoring sensors 1100 are used for determining at least indirectly a state of each one of the track systems 40, 40', 40*r*, 40*r'* and/or a condition of the ground surface on which the vehicle 60 travels. It is to be understood that the monitoring sensors 1100 can be embedded within, affixed, mounted or connected to any of the suitable components of the vehicle 60 and track systems 40, 40', 40*r*, 40*r'*. The monitoring sensors 1100 may be operatively connected to the track system controllers 1000 via wire or via a wireless connection. The operative connection between the monitoring sensors 1100 and the track system controllers 1000 is shown by the dashed lines in FIGS. 17A to 17C.

In some embodiments, the monitoring sensors 1100 include temperature sensors capable of determining the temperature of different components of the track systems 40, 40', 40*r*, 40*r'*. For example, temperature sensors can be embedded within or disposed proximate the endless tracks 600, the idler and support wheel assemblies 400*l*, 400*t*, 410*a*, 410*b*, 410*c* and/or the actuator assemblies 140, 150*l*, 150*t*, 310*l*, 310*t*, 420 for accurate temperature measurement of certain portions of each component. The temperature sensors could be thermal radiation thermometers, thermocouples, thermistors, or any other suitable type of sensing device capable of sensing temperature. In an embodiment where the temperature sensors are embedded in the endless tracks 600, they are disposed to determine the temperature at various locations on the endless track 600, for example on the inward and/or outward portions of the endless track 600, near or on the inner surface 602, near or on the drive lugs 604 and/or near or on the outer surface 606 of the endless track 600. The collected temperature data is sent as signals to the corresponding track system controller 1000. After processing the temperature data, the track system controller 1000 determines a corresponding output signal related to the actuation of any one of the actuator assemblies 140, 150*l*, 150*t*, 310*l*, 310*t*, 420 based on the signals received from the temperature sensors. In addition, the track system controller 1000 is operable to identify which temperature sensor sends a given signal based on a unique identifier associated with each temperature sensor.

For example, in order to reduce risks of damaging the endless tracks 600 due to excessive heat generation as the endless tracks 600 are driven, the track system controller 1000 of the track system 40 operates each one of the actuator assemblies 140, 150*l*, 150*t*, 310*l*, 310*t*, 420, alone or in combination, to correct the positioning of the frame assembly 200 and the idler and support wheel assemblies 400*l*, 400*t*, 410*a*, 410*b*, 410*c* relative to the chassis 62 and/or the ground surface. In an illustrative scenario, the temperature sensors determine that the inward portions of the endless track 600 have temperature readings that are higher than the temperature readings of the outward portions of the endless track 600, and that the difference in temperature readings is above a predetermined threshold. Based on the signals received from the temperature sensors, the system controller 1000 sends a signal to extend or retract the actuator 140 so as to adjust the camber angle θ of the track system 40 in order to more evenly distribute the load across the ground engaging segment 620 of the endless track 600. A more even load distribution across the ground engaging segment 620 may not only assist in reducing undesirable heat generation in certain portions of the endless tracks 600, but may also reduce soil compaction when driving on soft ground surface. As such, the track system 40 is capable of dynamically adjusting the camber angle θ based on data collected by the monitoring sensors 1100 and processed by the track system controller 1000.

In another illustrative scenario, the inward portions of the endless track 600 of the track system 40 have temperature readings that are higher than the temperature readings of the outward portions of the endless track 600, and that the difference in temperature readings is above a predetermined threshold. Based on the signals received from the temperature sensors, the system controller 1000 of the track system 40 sends a signal to extend or retract the actuators 150*l*, 150*t* so as to adjust the toe-in/toe-out angle γ of the track system 40. Proper alignment of the endless track 600 relative to the chassis 62 of the vehicle 60 may also assist in reducing undesirable heat generation and premature wear in certain portions of the endless track 600. As such, the track system 40 is also capable of dynamically adjusting the toe-in/toe-out angle γ based on data collected by the monitoring sensors 1100 and processed by the track system controller 1000.

In other embodiments, the monitoring sensors 1100 also include, in addition or in replacement of the temperature sensors, load cells (e.g. load transducers). The load cells can be piezoelectric load cells, hydraulic load cells, pneumatic load cells, or any other suitable type of cells capable of sensing a load applied thereto. In some embodiments, the load cells are provided at various locations on the vehicle 60 (as represented in FIGS. 17A to 17C), such as under the tank, container or cargo area, in order to monitor a payload of the vehicle 60 and to determine the location of the centre of gravity of the vehicle 60. In one scenario where the vehicle 60 travels on a laterally inclined ground surface, the track system controllers 1000 collectively determine the location of the centre of gravity of the vehicle 60 using data received from the load cells located on the vehicle 60. The track system controllers 1000 are then capable of sending signals to one another to extend or retract their corresponding actuator 140 so as to adjust the camber angle θ of their corresponding track systems 40, 40', 40*r*, 40*r'* in order to more evenly distribute the load across the ground engaging segment 620 of each of the endless tracks 600. This is another example of the track system 40 being capable of dynamically adjusting the camber angle θ based on data collected by the monitoring sensors 1100 and processed by one or more of the track system controllers 1000.

In some embodiments, additional load cells are disposed in various components of each track system 40, 40', 40*r*, 40*r'*. For example, in embodiments where load cells are embedded within the endless track 600 in the inward and outward portions thereof, the load data of each load cell is sent as signals to the corresponding track system controller 1000. In situations where the inward portion of the endless track 600 have load readings that are higher than the load readings of the outward portions of the endless track 600, and that the difference in load readings is above a predetermined threshold, the system controller 1000 sends a signal to extend or retract the actuator 140 so as to adjust the camber angle θ of the corresponding track system 40, 40', 40*r*, 40*r'* in order to more evenly distribute the load across the ground engaging segment 620. This way, soil compaction issues could be reduced compared to conventional track systems as the track system controllers 1000 dynamically adjust the position of the track systems 40, 40', 40*r*, 40*r'* relative to the chassis 62 of the vehicle 60 (i.e. adjusting the camber angle θ and/or the toe-in/toe-out angle γ) so as to more evenly distribute the load born by each track system across the ground engaging segment 620 of its respective endless track 600.

In other embodiments where each damper 300 is also operatively connected to its corresponding track system controller 1000, the load readings sent as signals by the load sensors located on the vehicle 60 to the track system controller 1000 also enable to dynamically adjust certain properties of the damper 300, such as the damping ratio, as a function of the load of the vehicle 60. As such, certain properties of the damper 300 of each track system 40, 40', 40*r*, 40*r'* are dynamically modified depending on the load readings.

In yet other embodiments, the monitoring sensors 1100 also include strain gauges. The strain gauges could be located, for example, at the pivot joints connecting the actuator assemblies 140, 150*l*, 150*t*, 310*l*, 310*t*, 420 to the frame assembly 200, or at the pivot joints of the frame assembly 200. In an illustrative scenario, a strain gauge is located at the pivot axis 224*l* of the track system 40, the track system 40 is initially in the configuration shown in FIG. 1, travels in the forward travel direction 80 and starts sinking down in a recess composed of soft soil. When a driving torque is applied to the sprocket wheel 550, the strain gauge has a reading that is above a certain threshold and sends a signal to the track system controller 1000. The track system controller 1000 also receives a signal from the vehicle 60 that a driving torque is applied to the drive shaft 64 for turning the sprocket wheel 550 and that the speed of the vehicle 60 does not increase. The track system controller 1000 sends a signal to retract the actuator assemblies 310*l*, 310*t* so as to change the configuration of the track system 40 from the one shown in FIG. 1 to the one shown for example in FIGS. 10A and 16. As described above, the configuration shown in FIGS. 10A and 16 benefits from an increased torque 760 and the track system 40 has a reduced tendency to pitch negatively, which can assist the track system 40 to drive itself out of the recess where it might be otherwise bogged down should the track system 40 have remained in the configuration shown in FIG. 1.

In some embodiments, the monitoring sensors 1100 include accelerometers. The accelerometers could be located, for example, on the attachment assembly 100 of each track system 40, 40', 40*r*, 40*r'*. In such an embodiment, the accelerometers detect the vibrations that have not been dampened or not dampened to a sufficient amount by the track systems 40, 40', 40*r*, 40*r'*. The accelerometers measure the vertical acceleration to which the attachment assembly 100 is subjected and send this data as signals to the corresponding track system controller 1000. Upon reception of the vertical acceleration signals, the track system controller 1000 processes this data and sends a signal to a cabin-mounted suspension assembly 1200 schematically represented in FIG. 18. The cabin-mounted suspension assembly 1200 is capable of moving the seat and/or the entire cabin that the operator occupies to subject it to vertical accelerations that have frequencies and amplitudes adapted to cancel out or reduce the vertical accelerations that the track systems 40, 40', 40*r*, 40*r'* experience and that are conducted to the cabin. As a result of the cooperation between the track systems 40, 40', 40*r*, 40*r'* and the cabin-mounted suspension assembly 1200, an operator located in the cabin receives less vibrations from the track systems 40, 40', 40*r*, 40*r'* and would therefore feel more comfortable than if the vehicle 60 was equipped with conventional track systems.

In yet other embodiments, the accelerometers are capable of detecting vibrations in the proximity of various components of the track systems 40, 40', 40*r*, 40*r'*. Signals generated by the accelerometers are sent to the track system controller 1000 which determines over time the usage and wear of the components of the track systems 40, 40', 40*r*, 40*r'*. This may be useful to obtain general information related to the condition of various components of the track systems 40, 40', 40*r*, 40*r'*, perform an analysis of the frequencies of the acceleration data and/or perform at the right time predictive maintenance operations to reduce risks of component failures. For example, the acceleration and vibration data related to bearings, pivot pins, seals and the gearbox 500 could be analyzed in real time and/or populate a database that could be analyzed to determine early signs of excessive wear or failure of components of the track systems 40, 40', 40*r*, 40*r'*.

In some embodiments, the monitoring sensors 1100 include inclinometers. The inclinometers could be located, for example, on the components of the frame assembly 200 and could be configured to send signals to the track system controller 1000 indicative of the camber angle θ of the axle assemblies connecting the idler and support wheel assemblies 400*l*, 400*t*, 410*a*, 410*b*, 410*c* to the frame assembly 200 relative to the plane 190 (FIGS. 5 and 6). Similar to what has been described above, the signals generated by the inclinometers are provided to the track system controller 1000 which operates the actuator assembly 140 to adjust the positioning of the frame assembly 200 and the idler and support wheel assemblies 400*l*, 400*t*, 410*a*, 410*b*, 410*c* relative to the chassis 62 and/or the ground surface in accordance with a predetermined objective. In some embodiments, the signals provided by the inclinometers could be used by the track system controller 1000 to assess and calibrate the operation of the actuator assembly 140 and/or to assess the wear of the tread 606 of the endless track 600.

In some embodiments, the monitoring sensors 1100 include fluid property sensors. The fluid property sensors could be located, for example, within the axle assemblies connecting the idler and support wheel assemblies 400*l*, 400*t*, 410*a*, 410*b*, 410*c* to the frame assembly 200. The fluid property sensors assess various properties and characteristics of the fluid contained within axle assemblies, such as viscosity, density, dielectric constant, temperature, presence of water, presence of suspended contaminants and wear debris. The data collected from the fluid property sensors could assist the track system controller 1000 to determine the condition and wear of some of the components of the track systems 40, 40', 40*r*, 40*r'*.

In some embodiments, the monitoring sensors 1100 could include actuator assembly position sensors. The actuator assembly position sensors could include linear displacement transducers connected to one or more of the actuator assemblies 140, 150*l*, 150, 310*l*, 310*t*, 420 that could send signals to the track system controller 1000 indicative of the position and/or length of the corresponding actuator assembly 140, 150*l*, 150*t*, 310*l*, 310*t*, 420. Using the signals provided by the linear displacement transducers, the track system controller 1000 could assess the status of extension/retraction of the actuator assemblies 140, 150*l*, 150*t*, 310*l*, 310*t*, 420 and assist in determining how to operate them. The actuator assembly position sensors could also include inclinometers connected to, for example, the leading and trailing idler actuator assemblies 310*l*, 310*t*. Using references and baselines, the inclinometers could send signals to the track system controller 1000 indicative of the position and/or length of the corresponding actuator assembly 310*l*, 310*t*. These signals could also assist the track system controller 1000 to assess the status of extension/retraction of the actuator assemblies 310*l*, 310*t* and assist in determining how to operate them.

In some embodiments, the monitoring sensors 1100 include position sensors capable of assessing a geographical location of each one of the track systems 40, 40', 40*r*, 40*r'*. The assessment of the geographical location may be useful for the track system controllers 1000 which could record data related to, for example, strain at pivot joints and vertical acceleration to which the track systems 40, 40', 40*r*, 40*r'* are subjected in conjunction with the geographical location. External sources of information could also be stored in the memory of the track system controllers 1000, such as detailed road plans, topography data and agricultural field terrain data. As such, in some embodiments, the track system controller 1000 learns optimal configurations of each of the track systems 40, 40', 40*r*, 40*r'* for each particular geographic location of the vehicle. In some embodiments, the track system controller 1000 is configured to prime and/or configure in real-time the actuator assemblies 140, 150*l*, 150*t*, 310*l*, 310*t*, 420 so that each of the track systems 40, 40', 40*r*, 40*r'* has the more appropriate configuration for the ground surface on which it travels. In some embodiments, the track system controller 1000 is configured to prime the track systems 40, 40', 40r, 40r' for each given geographical location by adjusting one or more of the actuator assemblies 140, 150l, 150t, 310l, 310t, 420 thereof just before the track systems 40, 40', 40r, 40r' reach each given geographical location. In some cases, and for some types of terrain, this allows the track system controller 1000 to distribute the vehicle's weight relatively more evenly across the track systems 40, 40', 40r, 40r' and/or more evenly into the terrain across each ground engaging segment 620 of each of the endless tracks 600 of each of the track systems 40, 40', 40r, 40r'. In some cases, and for some types of terrain, this allows to reduce soil compaction. In other words, in embodiments where the monitoring sensors 1100 include position sensors, the track systems 40, 40', 40r, 40r' become location-aware devices and they are capable of adapting their configuration accordingly. In some embodiments, the monitoring sensors 1100 do not include position sensors and the tack system controller 1000 receives the geographical location of the vehicle 60 that is provided by a position sensor (such as a GPS device) of the vehicle 60.

For example, in a situation where the track system controller 1000 determines that the geographical location of the track system 40 corresponds to a paved road, the track system controller 1000 sends a signal to retract the actuator assemblies 310l, 310t so that the track system 40 be configured as illustrated in FIG. 10A, for example. In another situation where the track system controller 1000 determines that the geographical location of the track system 40 corresponds to an agricultural field having soil sensitive to ground compaction, the track system controller 1000 sends a signal to extend the actuator assemblies 310l, 310t so as to distribute the load born by then track system 40 over a greater ground engaging segment 620.

Moreover, as each of the track systems 40, 40', 40r, 40r can have its geographical location monitored by the position sensors, the track system controllers 1000 of the front-mounted track systems 40, 40' are capable of communicating with the track system controllers 1000 of the rear-mounted track systems 40r, 40r' so that they adjust their configuration based on the data collected by the monitoring sensors 1100 of the front-mounted track systems 40, 40'. In an illustrative scenario, the vehicle 60 travels in a straight line, the track systems 40, 40r are initially in the configuration shown in FIG. 1 and the track system 40 is driven into a pothole. The geographical location of that pothole is recorded by the track system controller 1000 of the track system 40 and sent to the track system controller 1000 of the track system 40r. The leading and trailing idler actuators 310l, 310t of the track system 40 are retracted as shown in FIG. 10B so that the track system 40 is configured to drive itself out of the pothole, as described above. As the vehicle 60 travels forward, the track system controller 1000 of the track system 40r monitors the geographical location thereof and before the track system 40r is driven in the same pothole, the track system controller 1000 of the track system 40r sends a signal to retract the leading and trailing idler actuators 310l, 310t of the track system 40r as shown in FIG. 10B. Thus, when the track system 40r is driven into the pothole, the track system 40r is already configured so that driving out of that same pothole is facilitated.

In some embodiments, the track system controller 1000 is configured to adjust the configuration of each of the track systems 40, 40', 40r, 40r based on the data collected by the monitoring sensors 1100 in time for the track systems 40, 40', 40r, 40r arriving at particular terrain conditions, such that the configuration of each of the track systems 40, 40', 40r, 40r is optimized for the particular terrain conditions. In an illustrative scenario, the vehicle 60 at one point in time was travelling at a given speed and a given direction monitored by the track system controller 1000 and traveled over a pothole with the front right track system 40. At that time, the track system controller 1000 had detected the existence and the geographic location of the pothole, and stored this data in its memory. The next time when the vehicle 60 travels proximate the geographic location of the pothole, the track system controller 1000 may determine that the vehicle 60 will drive over the pothole again, but this time with its front left track system 40'. In such a case, the track system controller 1000 may determine a particular time associated with the impending driving over the pothole by the front left track system 40' using the geographic location of the front left track system 40' derived as described above, and the speed and direction of the vehicle 60. The track system controller 1000 may then retract the leading idler actuator 310l of the front left track system 40' just before the front left track system 40' reaches the pothole, and may thereby reduce the impact that the front left track system 40' will experience upon entering the pothole. In some embodiments, the track system controller 1000 may also retract the trailing idler actuator 310l of the front left track system 40'. In some cases this may assist the front left track system 40' in driving out of the pothole.

Once the front left track system 40' exits the pothole, the track system controller 1000 may extend the leading idler actuator 310l and/or the trailing idler actuator 310t of the front left track system 40' to the "pre-pothole" position(s). In some embodiments, the track system controller 1000 is further configured to adjust the leading idler actuator 310l and/or the trailing idler actuator 310t while a given one of the track systems 40, 40', 40r, 40r' is engaged with a pothole or other obstacle in order to improve traction.

In some embodiments, the monitoring sensors 1100 also include ground surface sensors. The ground surface sensors can include devices such as sonars, hygrometers, penetrometers, ultrasonic, microwave-based, radar and lidar devices capable of generating an accurate representation of the ground on which the vehicle 60 travels or is about to travel. The sonars, hygrometers and penetrometers could provide data related to, for example, composition of the soil, moisture content, air content, etc., and the ultrasonic, microwave-based, radar and lidar devices could provide an accurate representation of the ground surface profile and potential hazards. The data of the ground surface sensors is sent as signals to the track system controllers 1000 which then determine the more appropriate configuration of the track systems 40, 40', 40r, 40r' based on the assessed representation of the ground surface. For example, in a situation where the ground surface sensors and the track system controllers 1000 determine that the ground surface is relatively hard and bumpy, the track system controllers 1000 send signals to retract the actuator assemblies 310l, 310t to configure the track systems 40, 40', 40r, 40r' in the configuration shown in FIG. 10A. In another situation where the ground surface sensors and the track system controllers 1000 determine that the ground surface is relatively moist and soft and composed of loosely packed particles, the track system controllers 1000 send signals to extend the actuator assemblies 310l, 310t to configure the track systems 40, 40', 40r, 40r' in the configuration shown in FIG. 1.

Based on the above description, it is understood that in certain embodiments the monitoring sensors 1100 could include all of the above-described sensors, and that in other embodiments, only a subset of the above-described sensors would be included. The monitoring sensors 1100 could thus enable the track systems 40, 40', 40r, 40r' to anticipate the properties of the ground surface on which they are about to travel and/or anticipate obstacles to overcome, and permit the modification of the configuration of the track systems 40, 40', 40r, 40r' accordingly.

As described above, the monitoring sensors 1100 are thus capable of determining a state of the track system 40 and/or a ground surface condition of the ground on which the track system 40 travels. Determining a state of the track system 40 includes, and is not limited to, (i) determining the temperature of different components and/or portions of the track system 40, (ii) determining the load supported by different components and/or portions of the track system 40, (iii) determining the strain undergone by different components and/or portions of the track system 40, (iv) determining the vibration undergone by different components and/or portions of the track system 40, (v) determining wear of different components and/or portions of the track system 40, (vi) determining the inclination of different components and/or portions of the track system 40, (vii) determining the status of extension/retraction of the actuator assemblies 140, 150*l*, 150*t*, 310*l*, 310*t*, 420, and (viii) determining the location of different components and/or portions of the track system 40. Determining a ground surface condition of the ground on which the track system 40 travels includes, and is not limited to, (i) determining whether the ground surface is a paved road or an agricultural field having soil sensitive to ground compaction, (ii) determining the hazards and the profile of the ground surface, and (iii) determining at least one of a composition, a moisture content, and an air content of the soil.

In summary and as described in more details above, the track system controllers 1000 and the monitoring sensors 1100 could assist in, among other things, (i) planning predictive maintenance operations, (ii) recording relevant data related to the properties of the ground surface on which the track systems 40, 40', 40r, 40r' travel (for mapping purposes for example), (iii) maintaining an appropriate tension in the endless tracks 600 depending on the properties of the ground surface, (iv) increase the comfort of the operator of the vehicle 60 should the vehicle 60 be equipped with a cabin mounted suspension assembly 1200 operatively connected to one or more track systems 40, 40', 40r, 40r', (v) reducing soil compaction issues on sensitive ground surfaces, and (vi) improving traction of the endless track 600 of each of the track systems 40, 40', 40r, 40r'.

Referring to FIG. 17B, a master control unit 1010 is provided on the vehicle 60 and operatively connected to control systems 61 of the vehicle 60. The track system controllers 1000 of the track systems 40, 40', 40r, 40r' and at least some of the monitoring sensors 1100 are operatively connected to the master control unit 1010. The master control unit 1010 includes a processing unit, a memory, is programmable and is configured to send and receive signals from/to the track system controllers 1000 and the vehicle 60. As the master control unit 1010 is simultaneously operatively connected to the track system controllers 1000 and to the vehicle 60, data provided by the control systems 61 of the vehicle 60 is taken into account by the master control unit 1010 and supplemented to the signals received from the monitoring sensors 1100 so as to have a more complete representation of the status of the vehicle 60 and track systems 40, 40', 40r, 40r'.

In certain situations, the master control unit 1010 can override the track control systems 1000 in controlling the operation of the actuator assemblies 140, 150*l*, 150*t*, 310*l*, 310*t*, 420 in accordance with a predetermined objective. In some circumstances, the master control unit 1010 is connected to a remote network 1020 via a communication device 1030, and data provided by the track system controllers 1000 and/or the control systems 61 of the vehicle 60 are collected by the master control unit 1010, uploaded to the remote network 1020 by the communication device 1030 and processed by a remote processing unit 1040 using, in some instances, supplemental data related to, for example, weather records, soil condition, etc. Processed data and/or control signals for the track system controllers 1000 obtained from the remote processing unit 1040 are downloaded to the master control unit 1010 via the remote network 1020 and communication device 1030 so that the master control unit 1010 controls the track system controllers 1000 according to this processed data and/or control signals.

Referring to FIG. 17C, the communication device 1030 is provided on the vehicle 60 and is operatively connected to the control systems 61 of the vehicle 60, to at least some of the monitoring sensors 1100 and to the track system controllers 1000 of the track systems 40, 40', 40r, 40r'. The communication device 1030 is in operative communication with a remote master control unit 1050 which is at a remote location of the vehicle 60. As such, in this embodiment, the master control unit 1050 is not onboard the vehicle 60 and thus, the processing of the data is performed remotely. Processed data and/or control signals for the track system controllers 1000 obtained from the master control unit 1050 are communicated to the communication device 1030 so that the track system controllers 1000 is operated according to this processed data and/or control signals.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A track system for use with a vehicle having a chassis and a driveshaft extending laterally outwardly from the chassis, the track system comprising:

an attachment assembly connectable to the chassis of the vehicle and defining a pitch pivot axis;

a frame assembly disposed laterally outwardly from the attachment assembly and connected to the attachment assembly, the frame assembly being pivotable about the pitch pivot axis, and the frame assembly including at least one wheel-bearing frame member;

a leading idler wheel assembly at least indirectly connected to the at least one wheel-bearing frame member;

a trailing idler wheel assembly at least indirectly connected to the at least one wheel-bearing frame member;

at least one support wheel assembly at least indirectly connected to the at least one wheel-bearing frame member, and the at least one support wheel assembly being disposed between the leading idler wheel assembly and the trailing idler wheel assembly;

an endless track extending around the leading idler wheel assembly, the trailing idler wheel assembly, and the at least one support wheel assembly;

a sprocket wheel at least indirectly connected to the drive shaft for driving the endless track; and at least one idler actuator for adjusting the pivotal positioning of at least one of the leading and trailing idler wheel assemblies relative to the frame assembly including raising the at least one of the leading and trailing idler wheel assemblies to reduce an amount of endless track in flat ground contact and lowering the at least one of the leading and trailing idler wheel assemblies to increase the amount of endless track in flat ground contact;

wherein:

a first torque is applied to the frame assembly about the pitch pivot axis when the at least one of the leading and trailing idler wheel assemblies is lowered, and a second torque being greater in magnitude than the first torque is applied to the frame assembly about the pitch pivot axis when the at least one of the leading and trailing idler wheel assemblies is raised.

2. The track system of claim 1, wherein actuation of the at least one idler actuator modulates at least one of an approach angle of the track system and a departure angle of the track system.

3. The track system of claim 1, wherein:

the frame assembly includes:

a leading frame member pivotably connected to the attachment assembly for pivoting about the pitch pivot axis, and a trailing frame member pivotably connected to the attachment assembly for pivoting about the pitch pivot axis, the trailing frame member pivoting independently from the leading frame member.

4. The track system of claim 3, wherein the at least one wheel-bearing frame member includes:

a leading wheel-bearing frame member at least indirectly pivotably connected to the leading frame member, and a trailing wheel-bearing frame member at least indirectly pivotably connected to the trailing frame member.

5. The track system of claim 4, wherein a load supported by the trailing wheel-bearing frame member is greater than a load supported by the leading wheel-bearing frame member.

6. The track system of claim 3, wherein the track system further includes a damper interconnecting the leading frame member and the trailing frame member.

7. The track system of claim 6, wherein the damper is connected to an upper end of the leading frame member and an upper end of the trailing frame member.

8. The track system of claim 6, wherein the damper is configured to limit relative range of motion between the leading frame member and the trailing frame member.

9. The track system of claim 1, wherein the at least one idler actuator includes:

a first idler actuator for adjusting the pivotal positioning of the leading idler wheel assembly relative to the frame assembly; and a second idler actuator for adjusting the pivotal positioning of the trailing idler wheel assembly relative to the frame assembly.

10. The track system of claim 1, further comprising:

at least one monitoring sensor for determining, at least indirectly, at least one of a state of the track system and a ground surface condition; and a track system controller communicating with the at least one monitoring sensor for receiving a signal indicative of the at least one of the state of the track system and the ground surface condition, the track system controller being configured to connect to and to control the operation of the at least one idler actuator based on the at least one of the state of the track system and the ground surface condition.

11. The track system of claim 10, wherein the track system controller controls the operation of the at least one actuator in response to a second signal received from a manual override, a master control unit mounted to the vehicle, a remote processing unit, or a remote master control unit.

12. The track system of claim 10, wherein the at least one monitoring sensor includes at least one of a load sensor, temperature sensor, accelerometer, strain gauge, fluid property sensor, inclinometer, actuator assembly position sensor, geographical location sensor, hygrometer, penetrometer, sonar device, ultrasonic device, microwave-based device, radar device, and lidar device.

13. The track system of claim 10, wherein the track system controller controls the operation of the at least one idler actuator in accordance with a predetermined objective.

14. The track system of claim 13, wherein the predetermined objective is to limit pitching of the frame assembly about the pitch pivot axis.

15. The track system of claim 1, wherein:

the attachment assembly includes:

a pitch pivot defining the pitch pivot axis, the frame assembly being connected to the pitch pivot; and a roll pivot defining a roll pivot axis of the track system, the track system further includes: at least one actuator connected between the attachment assembly and the frame assembly for pivoting the frame assembly about the roll pivot axis.

16. The track system of claim 15, wherein the attachment assembly further includes a yaw pivot defining a yaw pivot axis of the track system, the frame assembly being further pivotable about the yaw pivot axis upon operation of the at least one actuator.

17. The track system of claim 16, wherein the at least one actuator includes first, second and third actuators, the first actuator being operable for pivoting the frame assembly about the roll pivot axis, and the second and third actuators being operable for pivoting the frame assembly about the yaw pivot axis.

18. The track system of claim 17, wherein the second actuator is a leading tracking actuator located forward of the roll pivot, and the third actuator is a trailing tracking actuator located rearward of the roll pivot.

19. A vehicle having first and second track systems according to claim 1, wherein the track system controller of the first track system is at least indirectly connected to the track system controller of the second track system, and the track system controller of the first track system controls the operation of the at least one idler actuator of the first track system based on the at least one of the state of the second track system and the ground surface condition determined by the at least one monitoring sensor of the second track system.

* * * * *